United States Patent
Sakamoto

(10) Patent No.: US 6,201,550 B1
(45) Date of Patent: Mar. 13, 2001

(54) IMAGE FORMING APPARATUS AND METHOD OF GENERATING GRADATION PATTERN

(75) Inventor: Shoji Sakamoto, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/106,136

(22) Filed: Jun. 29, 1998

(30) Foreign Application Priority Data

Jun. 30, 1997 (JP) .................................................. 9-174019
Jul. 10, 1997 (JP) .................................................. 9-184714

(51) Int. Cl.$^7$ ........................................................ G06K 9/00
(52) U.S. Cl. ........................... 345/442; 345/440; 345/441
(58) Field of Search ........................................ 345/442, 441, 345/440, 89; 382/180; 395/112–117

(56) References Cited

FOREIGN PATENT DOCUMENTS 8-72317    3/1996  (JP) .

Primary Examiner—Jeffery Brier
Assistant Examiner—Daniel J Chung
(74) Attorney, Agent, or Firm—Oliff & Berridge, PLC

(57) ABSTRACT

A high-speed image forming apparatus may alleviate a load imposed upon the drawing processing of the gradation. A drawing unit writes data in a page buffer while executing the drawing processing by using the drawing data stored in a drawing data storage unit. At that time, when generation of the gradation is instructed, the drawing unit accesses a gradation generation unit. The gradation generation unit sets a plurality of adjacent band-like regions which are perpendicular to a straight line connecting a start point with an end point and in which color values therein become uniform by using the vector of the changing direction of the transferred color and the color information at the start and endpoints, obtains the intersection point between the boundary of the band-like region and the scanning line, and sets such intersection point as the color changing point. At every scanning line, the color changing point and the color between the color changing points are successively obtained, and the gradation pattern in the scanning direction is generated successively.

11 Claims, 26 Drawing Sheets

```
1.0    0    0    setrgbcolor  } 61

200   200       moveto
100    0        rlineto
 0   -100       rlineto        } 62
-100   0        rlineto
closepath fill                            } 63
```

Fig. 7

```
<<
/GType       1
/StartPoint  [210 110]
/EndPoint    [310 190]
/StartColor  [1. 0 0 0]
/EndColor    [0 1.0 0]
/GStep       []
>>
setgrad
```
} 71

```
200   200   moveto
100   0     rlineto
0     -100  rlineto
-100  0     rlineto
closepath
```
} 72

```
fill
```
} 73

Fig. 23

```
       ⎧  <<
       ⎪  /GType          (circle)
       ⎪  /StartPoint     [290 110]
141 ──⎨  /EndPoint       [290 210]
       ⎪  /StartColor     [1. 0 0 0]
       ⎪  /EndColor       [0 1. 0 0]
       ⎪  /GStep          [ ]
       ⎩  >>
142 ──── setgrad ⎧  200= 200      moveto
       ⎪  100   0       rlineto
143 ──⎨  0    -100     rlineto
       ⎪  -100  0       rlineto
       ⎩  closepath 144 ──── fill
```

IMAGE FORMING APPARATUS AND METHOD OF GENERATING GRADATION PATTERN

BACKGROUND OF THE INVENTION

The present invention generally relates to an image forming apparatus for forming image information by executing image drawing commands, and more particularly relates to an image forming apparatus capable of effectively describing and reproducing a drawn graphics image using a gradation pattern whose colors are progressively changed, and a method of generating a gradation pattern.

Heretofore, as document composition systems and document print systems using computer systems are sophisticated, representation techniques used therein are also sophisticated. In order to execute the effective presentation and the solid geometric representation, there has been used a technique called gradation for progressively changing a color of a certain graphics image area.

While a document composition software is able to designate gradation by using a variety of user interfaces, this imposes a large load on the printer side when the printer prints the gradation. The reason for this is that a page description language for describing document data is unable to effectively describe the gradation. As a result, to realize the gradation, a page description language is described by the procedure in which regions of the same shape but having slightly different colors are drawn in an overlapping fashion with each other with slight displacements. For example, in a gradation in which colors are changed smoothly in a concentric circle fashion, it is necessary to repeatedly execute the processing in which a large circle is drawn and filled with a pattern and a little smaller circle is drawn on the above circle with a different color in an overlapping fashion and then filled with a pattern until the position reaches the center position of the circle. Thus, when the page description language processing system generates the gradation pattern, it is unavoidable that the complicated procedure should be executed, thereby resulting in the processing load being increased.

On the other hand, Japanese Published Unexamined Patent Application No. Hei 8-72317 describes a method of realizing a gradation on the printer side. This method introduces a gradation description as a part of description method of a page description language. When this page description is interpreted, the gradation pattern expanded as the background is cut out by the shape of the drawing target graphic form, thereby resulting in the gradation within the printer being realized. Also, according to this method, in order to draw a gradation of a circumference shape, a boundary of very small concentric circle-shaped regions is calculated by using a DDA (digital differential algorithm). DDA is a well-known algorithm for computing a position at which an intersection point of a graphic form crossing a certain scanning line is moved on the next scanning line. By using this algorithm, all intersection points with the scanning line are computed previously and the filling processing between the intersection points is executed.

However, in accordance with the method described in Japanese Published Unexamined Patent Application No. Hei 8-72317, since the gradation pattern larger than the graphic form shape is one expanded and cut out along the graphic form shape, it is necessary to compute colors of other regions than the drawing target region. Moreover, in the case of the gradation of the concentric circle shape, the proceeding direction of the computation is directed in the boundary of the concentric circle-shape region, which processing is not suitable for the filling processing on the scanning line. There is then the problem that independent processing steps are required.

SUMMARY OF THE INVENTION

In view of the aforesaid aspect, it is an object of the present invention to provide an image forming apparatus and a gradation drawing method in which a load for drawing a gradation may be alleviated.

Furthermore, in the image forming apparatus according to the present invention, when the generation of the gradation is instructed as the image drawing command, the drawing means accesses the gradation generating means. In that case, the drawing means transfers coordinate values of two points, namely vector start point and end point on the drawing plane on the drawing plane and color values of said start point and said end point, as gradation information for designating a gradation pattern. The gradation generating means expresses a gradation pattern whose color value is progressively changed along a straight line in a plurality of adjacent band-like regions perpendicular to the straight line connecting the start point with the end point and in which color values therein become uniform by using the gradation information, and generates gradation patterns of respective scanning lines by successively specifying portions included in each band-like region of the scanning line direction in a drawing region for drawing a gradation pattern of respective scanning line. Then, the gradation pattern is generated by executing this processing on each scanning line. Furthermore, this is also true in the gradation pattern generation method of the present invention. At every scanning line, the gradation pattern is generated in the direction of the scanning line.

Since the gradation pattern is generated at every scanning line as described above, a large gradation pattern need not be previously generated in the background unlike the prior art. Thus, a memory amount and a processing time may be reduced considerably. Furthermore, by advancing the processing in the scanning line direction, this processing may be matched with other drawing processing than the gradation processing in which the processing is executed at the unit of the scanning line.

According to an aspect of the present invention, there is provided an image forming apparatus for obtaining an output image by executing image drawing commands. This image forming apparatus is comprised of command analysis means for analyzing an inputted print job and generating a drawing command and drawing data which becomes parameters of the drawing command, drawing means for executing a drawing processing in accordance with the drawing command analyzed by the command analysis means, drawing data storage means for storing the drawing data, and gradation pattern expansion means accessed by the drawing means when gradation of a concentric circle shape is drawn, which expands a gradation pattern with respect to all scanning lines crossing the drawing region based on gradation information stored in the drawing data storage means.

According to the image forming apparatus, the command analysis means analyzes drawing data at the two points on the drawing plane and drawing data for drawing the gradation in which colors at the respective points are designated and stored in the drawing data storage means. When the drawing command for drawing the gradation is analyzed by the command analysis means, the analyzed drawing command is supplied to the drawing means, and the drawing means expands the gradation pattern by using the gradation pattern expansion means. At that time, the gradation pattern expansion means refers to the drawing data storage means, calculates based on the color designated by the drawing data and the coordinate values a color at the position in which the scanning line and the boundary of the drawing region cross each other, and repeats an operation in which the next color change position is calculated to the end of the drawing region, thereby calculating a sequence of pixels expressing changing colors in the sequential order within the drawing region. This processing is applied to all scanning lines crossing the drawing region, thereby generating the gradation pattern. Here, the shapes of the very small intervals with uniform color comprising the gradation pattern may be shapes of concentric circle and widths of the respective very small intervals need not always be made equal.

Further, according to the present invention, there is provided a gradation pattern drawing method for obtaining a gradation output image of a concentric circle shape by executing image drawing commands. This gradation pattern drawing method is comprised of the steps of obtaining parameters necessary for expressing gradation drawing of concentric circle shape by information indicative of a color change start position and a change range on a drawing plane and color value information at the change start position and a change range end point, calculating a unit width in which the same color is drawn on the basis of the change start position and the change range end point, calculating a length corresponding to a distance from a drawing start point of a drawing graphic form on a scanning line to a perpendicular straight line passing the change start position, computing on the basis of the calculated length the concentric circle-shaped region having the unit width to which the drawing start point belongs, and repeating a processing in which a movement amount on a scanning line from a process target intersection point to the next color change intersection point is computed and the computed movement amount is added to the gradation pattern until the movement amount exceeds a drawing end point of a drawing graphic form.

According to the above-mentioned gradation drawing method, on the basis of the parameters necessary for expressing the gradation drawing of concentric circle-shape, there is calculated a drawing range which is painted out on the scanning line from the position at which the scanning line and the concentric circle-shape regions drawn with the same color intersect with each other. Thus, the gradation drawing is executed in the same method as the ordinary filling processing.

BRIEF DESCRIPTION OF THE DRAWINGS

FIG. 7 is a diagram used to explain an example of programs of a print job including drawing instruction based on received gradation data in the image forming apparatus according to the first embodiment of the present invention;

FIG. 23 is a diagram showing an example of a gradation designation page description language entered into the image forming apparatus;

DESCRIPTION OF THE PREFERRED EMBODIMENTS

Figure 1:
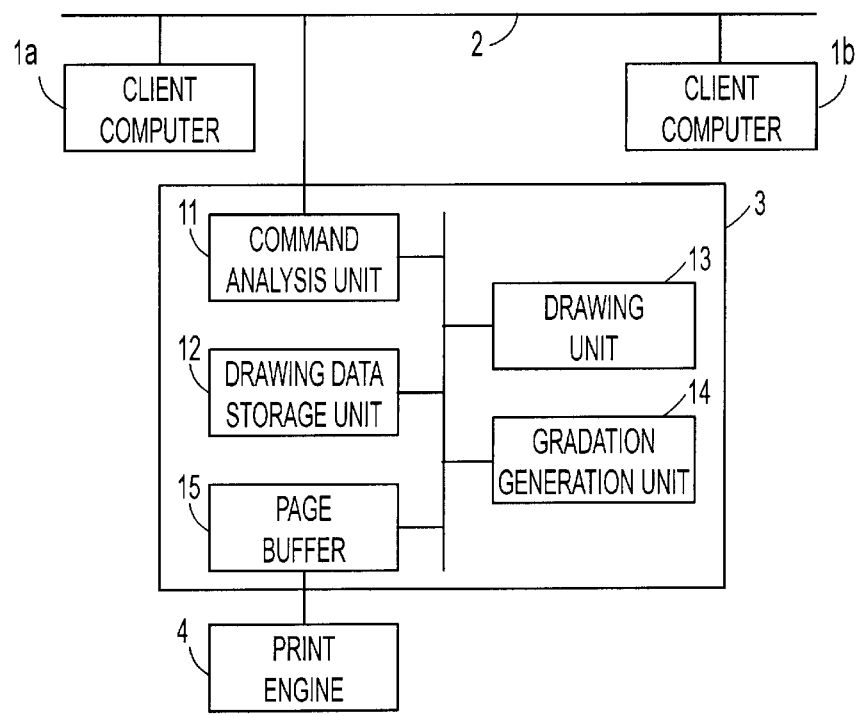
FIG. 1 is a block diagram showing an example of a system including an image forming apparatus according to a first embodiment of the present invention.

FIG. 1 is a block diagram showing an example of a system including an image forming apparatus according to a first embodiment of the present invention. As shown in FIG. 1, this system comprises client computers 1a, 1b, a network 2, an image forming apparatus 3, a print engine 4, a command analysis unit 11, a drawing data storage unit 12, a drawing unit 13, a gradation generation unit 14 and a page buffer 15. The system shown in FIG. 1 illustrates an example in which the image forming apparatus 3 according to the present invention is realized as a print system connected to the network 2. The client computers 1a, 1b also are connected to the network 2, and the image forming apparatus 3 is connected through the network 2 to the client computers 1a, 1b. A print job created by the client computers 1a, 1b is transferred through the network 2 to the image forming apparatus 3. Incidentally, the number of client computers that are connected to the network 2 is not limited to two, and two client computers or more may be connected to the network 2. Similarly, the number of the image forming apparatus 3 is not limited to one, and more than one computer may be connected to the client computers 1a, 1b. Further, the network 2 my be connected to other devices and other networks.

The print engine 4 which actually executes print recording is connected to the image forming apparatus 3. Image data generated by the image forming apparatus 3 is transferred to the print engine 4 at every page or at every band, for example. The print engine 4 enables image data to be visually confirmed, and outputs an image. Of course, the image forming apparatus 3 may include the print engine 4.

The image forming apparatus 3 includes the command analysis unit 11, the drawing data storage unit 12, the drawing unit 13, the gradation generation unit 14, the page buffer 15 and the like. The command analysis unit 11 receives, through the network 2, a print job described in the form of a page description language or the like, interprets the contents of the print job thus received, transfers drawing data to the drawing data storage unit 12 in such a manner that the drawing data is stored in the drawing data storage unit 12, and transfers a drawing command to the drawing unit 13. The drawing data comprises geometric data of drawing graphic and attribute data such as color and stroke width, both of which are accumulated in the drawing data storage unit 12. Also, if a gradation is designated, then such gradation information also is accumulated in the drawing data storage unit 12. The gradation information comprises two points representing end points of a vector corresponding to the color changing direction and values of colors at the positions of the two points. The end points of the vector in the color changing direction are given as coordinate values at that point and need not always be contained in a drawing region. The color value is given as coordinate values in the color space. The gradation information may further contain a shape of a unit gradation pattern and a distance between unit gradation patterns. In the following example, the shape of the unit gradation pattern may be a band-like shape surrounded by two straight lines perpendicular to the color changing direction. A distance between the unit gradation patterns is a distance obtained when the pattern is located in the color changing direction, and may use a series of values which fluctuate even when a constant fixed value is used.

The drawing data storage unit 12 holds drawing data supplied from the command analysis unit 11 and transfers the drawing data to the drawing unit 13 in response to the request of the drawing unit 13. When the drawing data is transferred to the drawing unit 13, the data thus transferred is not stored in the drawing data storage unit 12.

Having received the drawing command from the command analysis unit 11; the drawing unit 13 effects the drawing on the page buffer 15 by using the drawing data accumulated in the drawing data storage unit 12. If the gradation is designated, then the drawing unit 13 accesses the gradation generation unit 14 and generates gradation by using gradation information stored within the drawing data storage unit 12. If the gradation is not designated, then the drawing unit 13 executes the drawing similarly to a general page description language processing system.

When the gradation generation unit 14 is accessed by the drawing unit 13, the gradation generation unit 14 receives the gradation information from the drawing data storage unit 12, successively computes color changing positions in a drawing graphic existing range (hereinafter referred to as "gradation drawing area") on the scanning line on which the drawing unit 13 effects the drawing processing, and generates a gradation pattern of coordinates column, run-length representation or pixel value column.

In the first embodiment, in order to obtain a color value at the start position of the gradation drawing region on the scanning line, a vector from the start point of a vector of a color changing direction given as gradation information to the start position of the gradation drawing region on the scanning line is considered, the orthogonal projection of the color changing direction of that vector is computed, and the band-like region to which the point belongs is judged based on the length of the orthogonal projection. If the distance between the unit gradation patterns is a fixed value, then by computing a ratio between the computed length of the orthogonal projection and the fixed value, it is possible to easily detect the type of the band-like region to which the point belongs. Even when the distance between the unit gradation patterns is given by the series of the fluctuating values, it is possible to obtain a similar result by comparing the accumulated value and the length of the orthogonal projection. The resultant color value can easily be computed by using the increased amount of the color value which results from equally dividing a difference between the two color values which are given from the start.

In order to compute a changing point of the next color from the start position of the gradation drawing region on the scanning line, a length which results from projecting a distance vector from the point on the vector of the color changing direction obtained by the above-mentioned orthogonal projection to the boundary of the band-like region including the above point in the direction of the scanning line, might be added to the start position of the gradation drawing region on the scanning line. Future color changing positions on the scanning line might be calculated at every intersection point between the boundary of the band-like region an the scanning line and can be calculated by successively adding the lengths which result from projecting the distance vector between the unit gradation patterns in the direction of the scanning line.

In the gradation pattern thus generated, the band-like region and the color value are associated with each other so that the gradation pattern contains information of color values and color changing positions. Therefore, it is possible to generate the arrangement of pixel values or a column of combination of color values and coordinate values or color value and run-length format without executing a special processing. Moreover, data of such format may directly be generated in the process in which the gradation pattern is generated.

The page buffer 15 stores results drawn by the drawing unit 13. If the drawn result is the arrangement of the pixel value, then the page buffer 15 stores a color value at each pixel. If the drawn result is a coordinate sequence, then the page buffer 15 stores the drawn result as a set of start point coordinates, end point coordinates, and color values. If the drawn result is a run-length format of pixel value, then the page buffer 15 forms and holds run information by a set of a run start point, a run length, and a color value. The content of the page buffer 15 is transferred to the print engine 4 at a predetermined timing and thereby printed and recorded.

Figure 2:
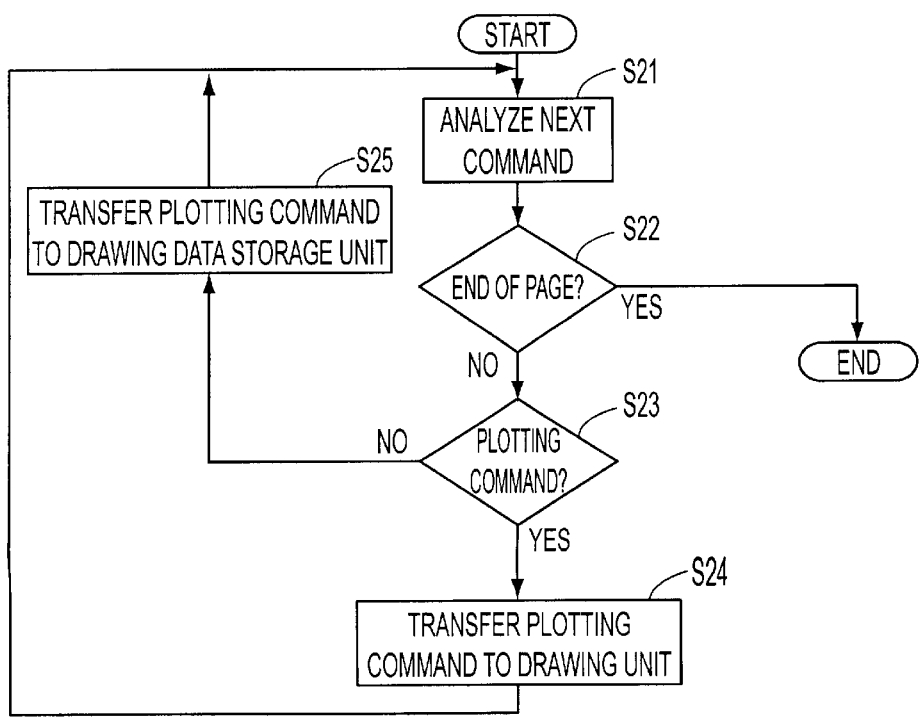
FIG. 2 is a flowchart to which reference will be made in explaining an operation of a command analysis unit in the image forming apparatus according to the first embodiment of the present invention.

An operation of the example of the system shown in FIG. 1 will be described. The print job created by the client computers 1a, 1b is supplied through the network 2 to the command analysis unit 11. FIG. 2 is a flowchart showing an example of an operation of the command analysis unit 11 in the image forming apparatus according to the first embodiment of the present invention. The command analysis unit 11 interprets the content of the print job supplied thereto through the network 2. Here, let it be assumed that the print job is a set of commands obtained at the unit of page.

Referring to FIG. 2, and following the start of operation, one command is extracted from the print job, and analyzed by the command analysis unit 11 at a step S21. In the next step S22, it is determined whether or not the page reaches the end. If the page does not yet reach the end as represented by a NO at the decision step S22, then control goes to the next decision step S23 to determine whether or not the analyzed command is the drawing command. If the analyzed command is the drawing command as represented by a YES at the decision step S23, then control goes to a step S24, whereat the drawing command is transferred to the drawing unit 13. If on the other hand the analyzed command is the drawing data as represented by a NO at the decision step S23, then control goes to a step S25, the drawing data is transferred to the drawing data storage unit 12 and thereby stored. Then, control goes back to the step S21, wherein the next command is analyzed. If it is determined at the decision step S22 that the page has reached the end, then it is regarded that one print job is ended, and the processing concerning the print job is ended. Then, control goes to a new print job processing. Alternatively, the image forming apparatus awaits the arrival of a new print job.

Figure 3:
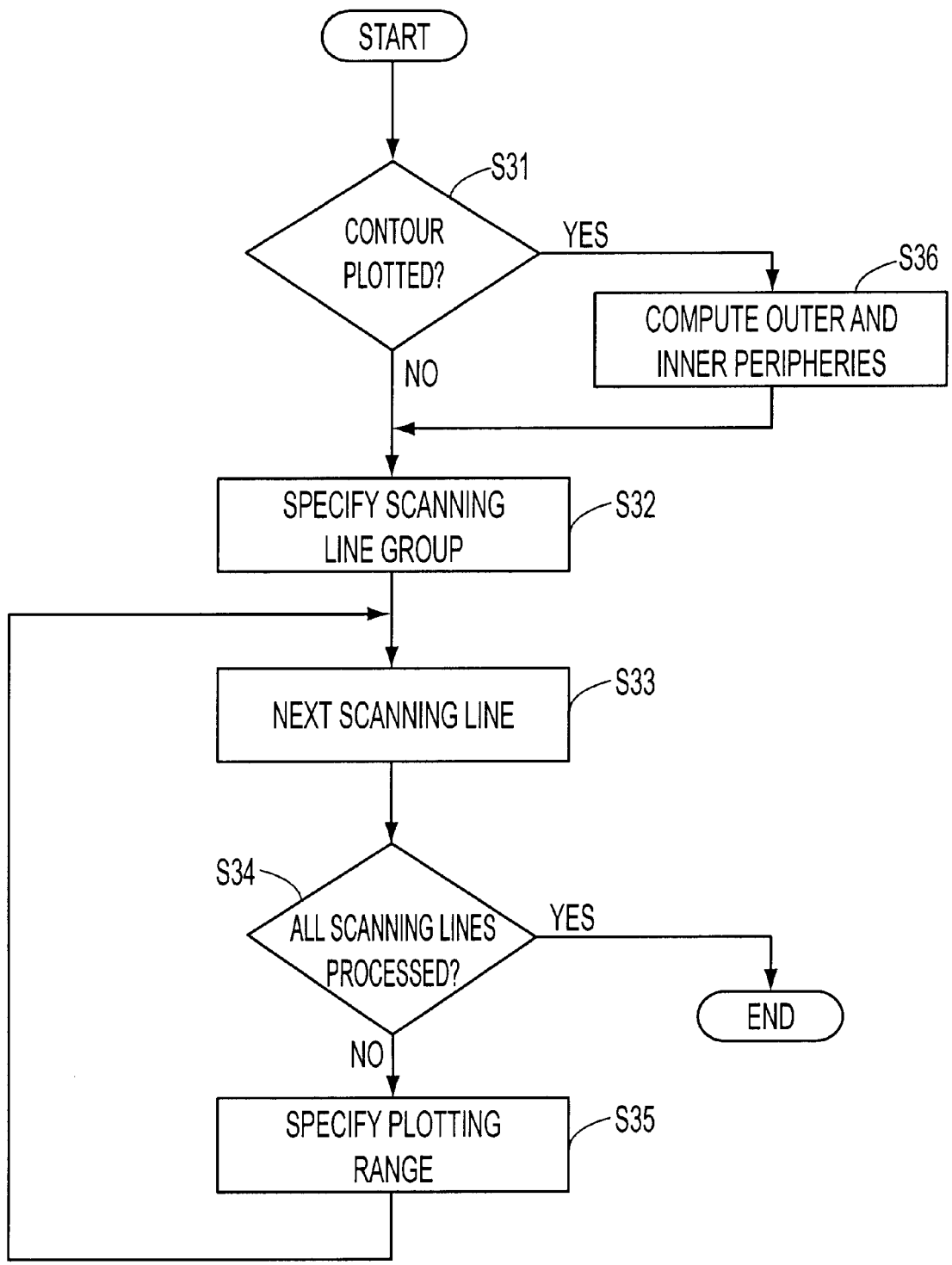
FIG. 3 is a flowchart to which reference will be made in explaining an operation of a drawing unit in the image forming apparatus according to the first embodiment of the present invention.

FIG. 3 is a flowchart showing an example of an operation of the drawing unit in the image forming apparatus according to the first embodiment of the present invention. When the drawing command is detected by the command analysis unit 11, the drawing unit 13 executes the drawing by using drawing data accumulated in the drawing data storage unit 12. As the drawing command, it is assumed that there are a filling command for painting out the inside of graphics instructed by the drawing data and a contour drawing command for drawing an instructed graphics as line graphics. Of course, there may exist other drawing commands, and the drawing unit 13 may execute the drawing similarly to a general page description language processing system.

Referring to FIG. 3, and following the start of operation, it is determined at a decision step S31 whether or not the drawing command transferred from the command analysis unit 11 is the contour drawing command. If the drawing command is the filling command as represented by a NO at the decision step S31, then control goes to a step S32, whereat a group of scanning lines crossed by the drawn graphics are specified based on the shape data of the drawn graphics. In a step S33, one of the scanning lines specified at the step S32 is extracted. Then, control goes to the next decision step S34, whereat it is determined whether or not the processing for all of the scanning lines specified at the step S32 is ended. In the next step S35, in the scanning line extracted at the step S33, an existing range in which graphics to be painted out exists is specified, and filling color information is disposed in the above existing range. At that time, when the page buffer 15 is comprised of the arrangement of pixel values, values of colors are stored as values of respective pixels in the existing range of the painted-out graphics. When the page buffer 15 is comprised of the run-length format of pixel values, the start point and the length of the run length are calculated from the graphics existing range on the scanning line, and the calculated start point and length form run information together with the color values and then added. Further, when the page buffer 15 stores the coordinate sequence and the colors, the start point and the end point of the graphics existing range on the scanning line and the color values are formed into a set and then added. At the completion of the processing concerning one scanning line, then control goes back to the step S33, whereby the processing concerning other scanning lines is repeated. When the processing concerning all scanning lines specified at the step S32 is ended, this is detected at a decision step S34, and the processing concerning one drawing command is ended.

If the drawing command transferred from the command analysis unit 11 is the contour drawing command as represented by a YES at the decision step S31, then control goes to a step S36, whereat a drawing boundary corresponding to the inside and the outside of the line drawn as line graphics is calculated by using stroke width information. Then, the inside of the drawing boundary is painted out by the filling processing following the step S32.

Figure 4:
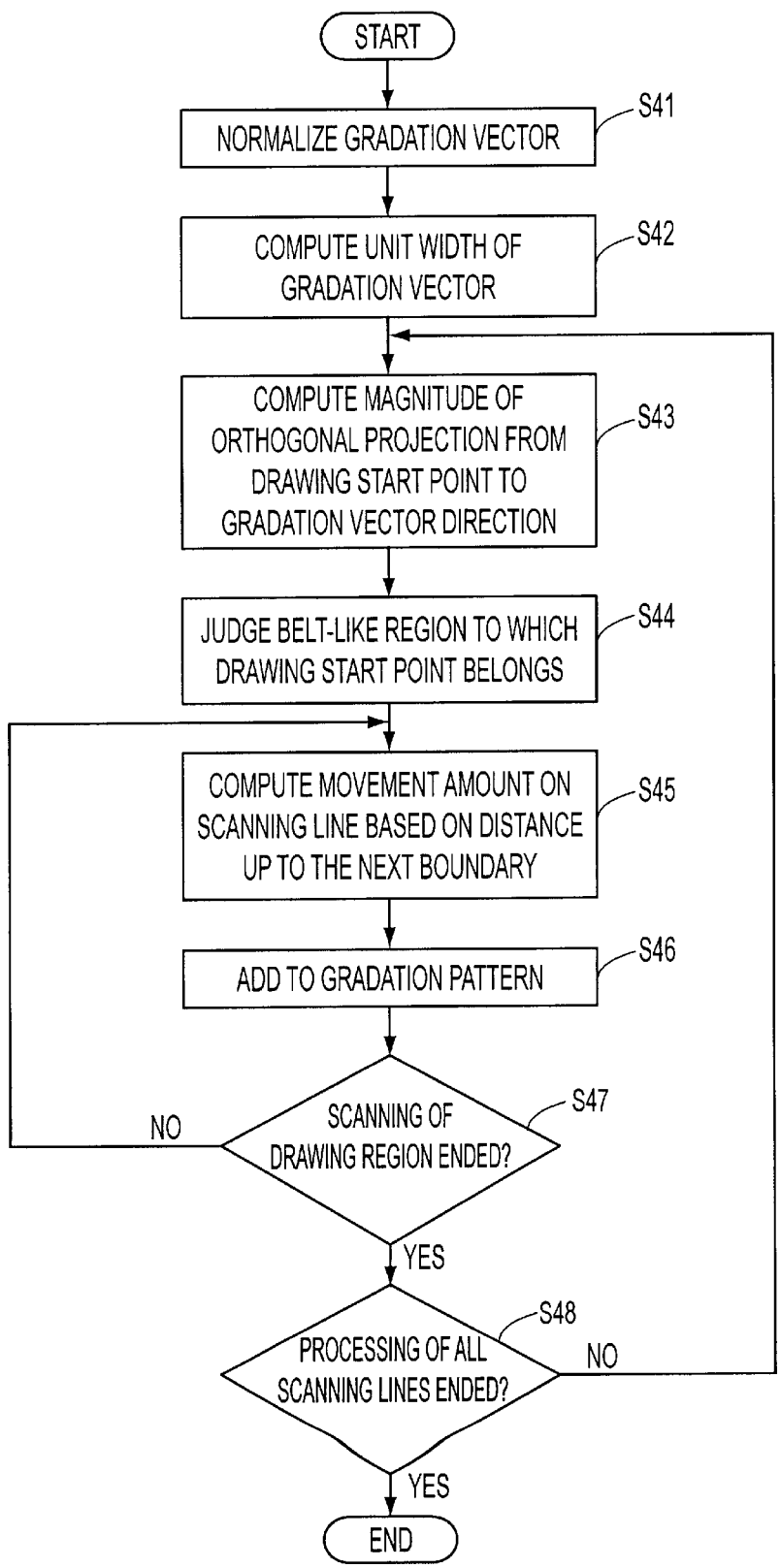
FIG. 4 is a flowchart to which reference will be made in explaining an operation of a gradation generation unit in the image forming apparatus according to the first embodiment of the present invention.
Figures 5, 6:
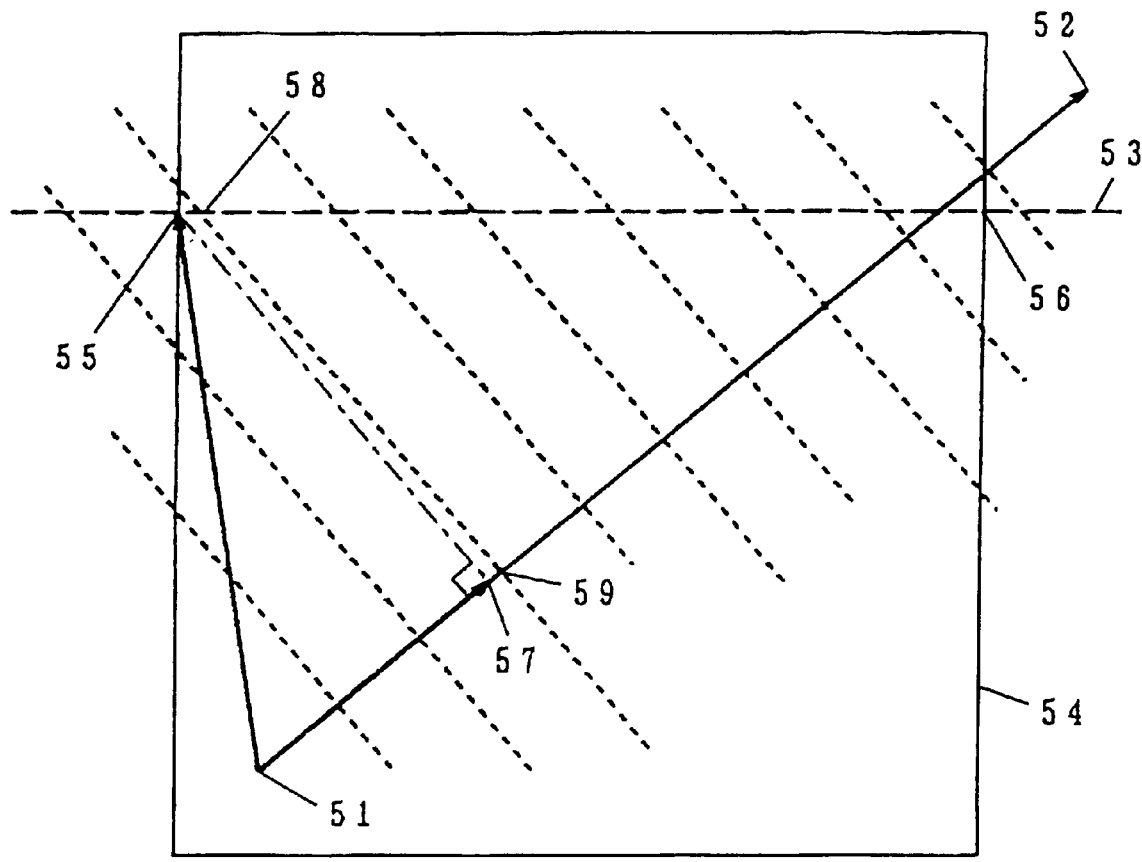
FIG. 5 is a diagram used to explain an example of an operation of the gradation generation unit in the image forming apparatus according to the first embodiment of the present invention.
FIG. 6 is a diagram used to explain an example of programs of a print job.

If a gradation is designated in the filling processing at the step S35, then the drawing unit 13 accesses the gradation generation unit 14. The gradation generation unit 14 receives gradation information from the drawing data storage unit 12, and executes the filling processing of the drawing graphics existing range on the scanning line drawn by the drawing unit 14 by gradation. FIG. 4 is a flowchart showing an example of the gradation generation unit 14 in the image forming apparatus according to the first embodiment of the present invention. FIG. 5 also is a diagram used to explain the operation of the gradation generation unit 14. Here, the shape of the unit gradation pattern is the band-like shape surrounded by two straight lines perpendicular to the color changing direction, and the boundaries are shown by dotted lines in FIG. 5. In FIG. 5, points 51 and 52 designate a start point and an end point of the vector of the color changing direction, respectively. This vector is referred to as "gradation vector". Color values at the start point 51 and the end point 52 of this gradation vector are assumed to be $c_s$, $c_e$, respectively. The square-like drawing graphics form is processed by a gradation processing, and the inside of this drawn graphics is assumed to be a gradation drawing region 54. Also, a scanning line 53 is processed by the gradation processing, and this scanning line 53 is shown by a broken line in FIG. 5. Of two intersection points of the scanning line 53 and the gradation drawing region 54, a point 55 is a drawing start point and a point 56 is a drawing end point.

Referring to FIG. 4, and following the start of operation, at a step S41, the gradation vector is normalized by dividing the gradation vector by its length, thereby resulting in a unit vector $e_g$ being obtained. In the next step S42, there is calculated a unit width $\Delta g$ of the gradation vector. If $\Delta c$ is the unit width obtained when the color value is changed, then a divided number N of the gradation vector is obtained by calculating $(c_e-c_s)/\Delta c$. It is possible to obtain the unit width $\Delta g$ of the gradation vector based on the divided number N and the length of the gradation vector. Although all unit widths of the gradation vectors become the same according to this method, this unit width may be given by the user explicitly. Moreover, the unit width $\Delta c$ of the color value may be selected from the values which enable the users to feel the color change smooth in consideration of man's perception, features of color space and a color reproduction ability of output devices.

At a step S43, there is calculated a magnitude of an orthogonal projection projected on the unit vector $e_g$ of the vector ranging from the start point 51 of the gradation vector to the drawing start point 55 of the scanning line 53. The size of the calculated orthogonal projection is a length ranging from the start point 51 of the gradation vector through the drawing start point 55 to the gradation vector or the point 57 which results from extending a perpendicular to a straight line containing the gradation vector in FIG. 5. And the band-like region to which the drawing start point 55 belongs is judged at a step S44. This band-like region may be judged by judging a band-like region to which the point 57 belongs. It is easy to calculate a value n which indicates the band-like region to which the point 57 belongs by comparing the orthogonal projection size calculated at the step S43 and the unit width $\Delta g$ calculated at the step 42. Since the point 57 and the drawing start point 55 are included in the same band-like region, it is to be understood that the drawing start point 55 belongs to the nth band-like region.

At a step S45, a distance to a boundary of the next band-like region is calculated, and the calculated distance is converted into a movement amount on the scanning line. A changing point of the next color on the scanning line is an intersection point between the boundary of the next band-like region and the scanning line. This may be obtained by multiplying the displacement on the gradation vector by a reciprocal number of cosine. For example, a changing point of the next color from the drawing start point 55 on the scanning line is a point 58. Assuming now that an intersection point between the boundary of the band-like boundary passing this point 58 and the gradation vector or the straight line including the gradation vector is a point 59, then a distance between the point 57 and the point 59 is multiplied by $1/\cos \theta$ where $\theta$ is an angle formed by the scanning line and the gradation vector. Succeeding color changing points on the scanning line can be obtained by successively adding the values which result from multiplying the width of the band-like region by the reciprocal of cosine. The color changing points and color information thus obtained are successively added to the page buffer 15 as gradation patterns at a step S46.

In the next decision step S47, it is determined whether or not the value of the color changing point exceeds the drawing end point 56. If the value of the color changing point does not yet exceed the drawing end point 56 as represented by a NO at the decision step S47, then control goes back to the step 45, and the steps S45, S46 are repeated. If the value of the color changing point reaches the drawing end point 56 as represented by a YES at the decision step S47, then control goes to the next decision step S48. In the decision step S48, it is determined whether or not all drawn scanning lines are processed. If there remain scanning lines which are not yet processed as represented by a NO at the decision step S48, then control goes back to the step S43, whereat the gradation pattern from the drawing start point to the drawing end point is generated with respect one scanning line which is not yet processed. Then, this processing is effected on all scanning lines and the processing of the gradation generation unit 14 is ended. Incidentally, since the processing for each scanning line is independent, these processing can be executed in parallel to each other. If the processing on all scanning lines is ended as represented by a YES at the decision step S48, then control is ended.

The gradation pattern thus generated by the gradation pattern generation unit 14 is accumulated in the page buffer 15. The content drawn by the drawing unit 13 and the gradation generation unit 14 and accumulated in the page buffer 15 is transferred to and printed by the print engine 4 in response to a print instruction.

The above-mentioned operation will be described with reference to a specific example. FIG. 6 is a diagram used to explain an example of a print job. Let it be assumed that the print job transferred from the client computers 1a, 1b or the like through the network 3 is described in the form of a page description language shown in FIG. 6. In this example, a description 61 is drawing data for designating a color, and a description 62 is drawing data for designating graphics shape. In the description 62, "moveto" instructs a movement of a start point and moves the start point to (200, 200). "rlineto" designates a line by a relative position, and shows a line from (200, 200) to (300, 200), a line from (300, 200) to (300, 100), and a line from (300, 100) to (200, 100). "closepath" shows a line from the position of the present coordinates to the start point, i.e. a line from (200, 100) to (200, 200), and can designate a closed graphic. That is, the description 62 may give a drawing graphic shape of a square having an upper left vertex (200, 200), a width of 100 and a height of 100. When detecting the descriptions concerning these drawing data, the command analysis unit 11 supplies such information to the drawing data storage unit 12.

Also, a description 63 is a drawing command which instructs a filling. When detecting the description concerning the drawing command, the command analysis unit 11 transfers the detected description to the drawing unit 13. The drawing command is not limited to "fill" which paints out the graphic form, and may be "stroke" which draws a contour. These drawing commands refer to shape data (e.g. description 62) representing a shape of graphic form and attribute data (e.g. description 61 as color information) such as color and stroke width. These shape data and attribute data are accumulated in the drawing data storage unit 12 before the drawing command, and read out from the drawing data storage unit 12 when the drawing command such as "fill" and "stroke" is executed. At that time, the drawing data storage unit 12 does not store read-out drawing data.

In the example shown in FIG. 6, the description provides the "fill" command which designates a filling. The filling operation is executed by the step S32 in FIG. 3 and the following steps. In the step S32, a scanning line crossed by the graphic form is calculated from the shape data of the drawn graphic. In the steps S33 to S35, color information of filling is disposed in the existing ranges of drawn graphic forms in the respective scanning lines. When the stroke command which instructs the contour drawing, in a step S36, the drawing boundary corresponding to the inside and outside of the line is calculated by using stroke width information. Thereafter, the processing is executed similarly to the filling processing.

In the example shown in FIG. 6, since the gradation is not designated, the drawing processing is executed similarly to the general page description language processing system. The drawn result of the drawing unit 13 is generated on the page buffer 15. At a proper timing in which the drawing of one page is ended or the print job is ended, the drawn result is supplied from the page buffer 15 to the print engine 4 and thereby printed.

FIG. 7 is a diagram used to explain the print job including the drawing instruction based on the received gradation in the image forming apparatus according to the first embodiment of the present invention. In FIG. 7, descriptions 72 and 73 are similar to the descriptions 62 and 63 in FIG. 6. A description 71 is drawing data concerning the gradation. Of this description 71, the start point and the end point of the gradation vector are given by "/StartPoint" and "/EndPoint", and colors of the start point and the end point of the gradation vector are designated by "/StartColor" and "/EndColor". This designated data is stored in the drawing data storage unit 12 by "setgrad". In the example shown FIG. 7, there is supplied a band-like gradation in which the start point of the gradation vector is (210, 110), the end point is (310, 190) and colors of these start point and end point are (1. 0, 0, 0), (0, 1. 0, 0). Also, the description designates a drawing graphic shape which becomes a square in which the upper left vertex is (200, 200), the width is 100 and the height is 100 as described above. These descriptions are analyzed by the command analysis unit 11 and supplied to and stored in the drawing data storage unit 12.

Subsequently, when the drawing command (description 73) for instructing the filling is detected, this drawing command is supplied to the drawing unit 13. The drawing unit 13 executes the drawing processing with reference to the drawing graphic shape data and the drawing attribute data stored in the drawing data storage unit 12. Since the filling based on the band-like gradation is instructed, the drawing unit 13 activates the gradation generation unit 14 to execute the filling based on the gradation.

Figure 8:
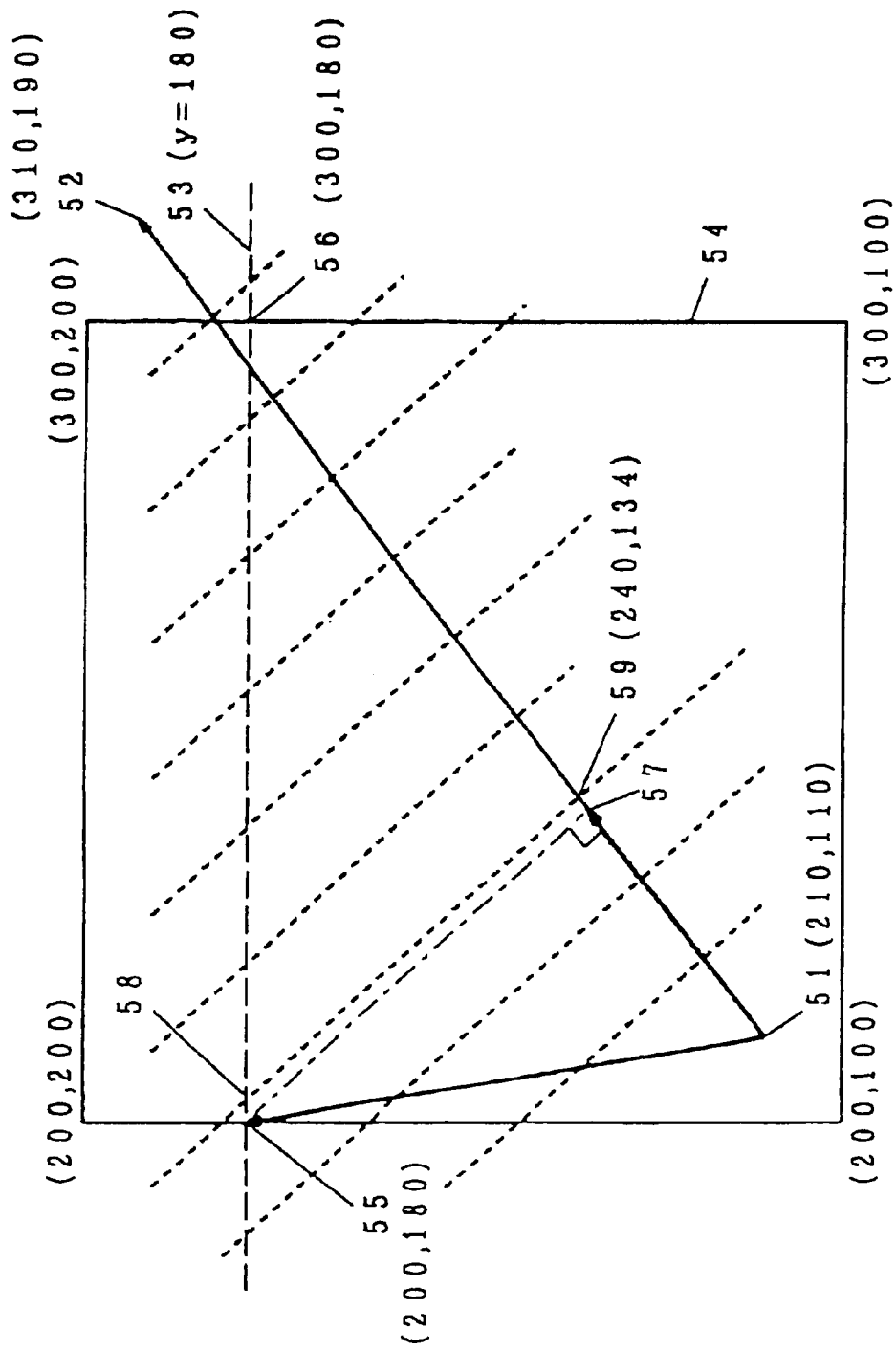
FIG. 8 is a diagram used to explain the manner in which a gradation pattern is generated in the image forming apparatus according to the first embodiment of the present invention.

The gradation generation unit 14 receives the above-mentioned drawing data and generates a gradation pattern for each scanning line in accordance with the algorithm shown in FIG. 4. FIG. 8 is a diagram used to explain a specific example in which a gradation pattern is generated in the image forming apparatus according to the first embodiment of the present invention. A scanning line in which y=180 is established will be described by way of example. With respect to this scanning line 53, a drawing start point 55 becomes (200, 180), and a vector formed by this drawing start point 55 and the start point (210, 110) of the gradation vector becomes (-10, 70). A size of orthogonal projection projected onto a unit vector $(5/\sqrt{41}, 4/\sqrt{41})$ in the gradation vector direction becomes $(230/\sqrt{41})$. Assuming that the number of the divided gradation vectors is 10 on the basis of the unit of color, then the unit width becomes $2\sqrt{41}$. Thus, it is to be understood that the point 57 advanced from the start point of the gradation vector by the size of the orthogonal projection belongs to the third band-like region. The color value at this point is represented as (0.2, 0.8, 0).

Then, there is calculated a color changing point 58 from the drawing start point 55. To this end, a distance from the point 57 to the next color changing point on the gradation vector is calculated and converted into a distance on the scanning line. The next color changing point from the point 57 on the gradation vector is an intersection point between the boundary of the third and fourth band-like regions and the gradation vector, and hence the coordinates are (240, 134). A distance between the points 57 and 59 becomes $16/\sqrt{41}$. Then, this distance is multiplied by a reciprocal $\sqrt{41}/5$ of a cosine of an angle formed by the gradation vector and the scanning line and thereby converted into a distance on the scanning line. A resultant value 3.2 becomes a distance from the drawing start point 55 to the next color changing point on the scanning line.

The succeeding color changing points can be successively obtained by repeating the addition of a value 16.4 which results from multiplying the unit width $2\sqrt{42}$ of the gradation vector by the reciprocal $\sqrt{41}/5$ of the cosine. By executing the above-mentioned processing on each of the scanning lines, the gradation patterns within the drawing graphic form 54 are generated and accumulated in the page buffer 15. When the print instruction is issued, the content of the page buffer 15 is supplied to the print engine 4 and thereby printed.

According to the above-mentioned method, the same graphic form need not be repeatedly drawn in order to express the gradation, and the expansion of the gradation pattern may be limited to the inside of the drawing target region. Therefore, the gradation can be drawn at high speed.

An image forming apparatus according to a second embodiment of the present invention will be described next. Elements and parts in the second embodiment are similar to those of the first embodiment shown in FIG. 1. Also, the operations of the command analysis unit 11 and the drawing unit 13 are similar to those of the first embodiment shown in FIGS. 2, 3. The gradation generation unit 14 according to the second embodiment will be described hereinafter. In the first embodiment, the gradation generation unit 14 calculated the color of the drawing start point and the coordinates of the color changing point on the gradation vector. According to the second embodiment, these can be calculated on the scanning line.

Figure 9:
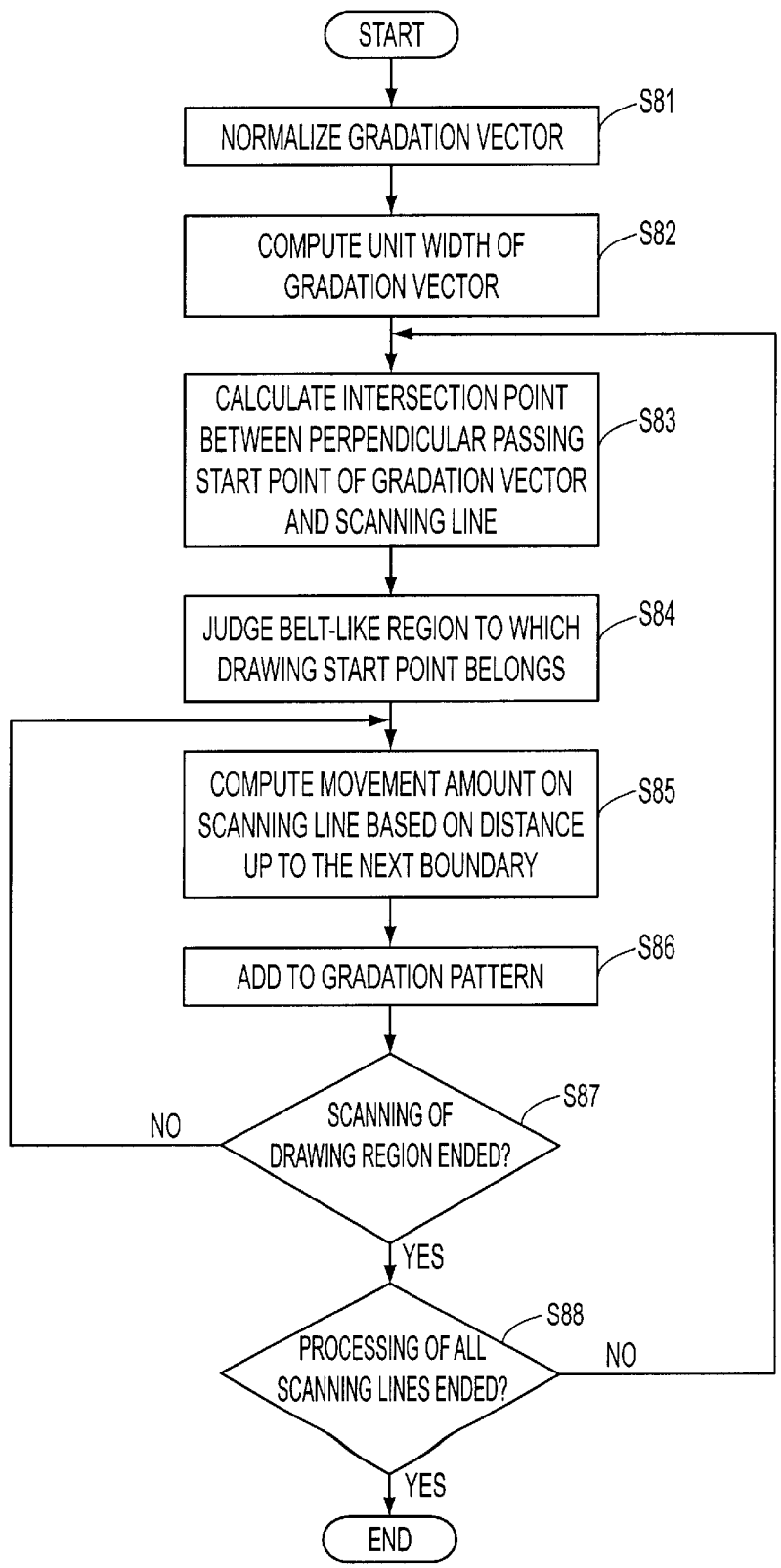
FIG. 9 is a flowchart to which reference will be made in explaining an operation of a gradation generation unit in an image forming apparatus according to a second embodiment of the present invention.
Figure 10:
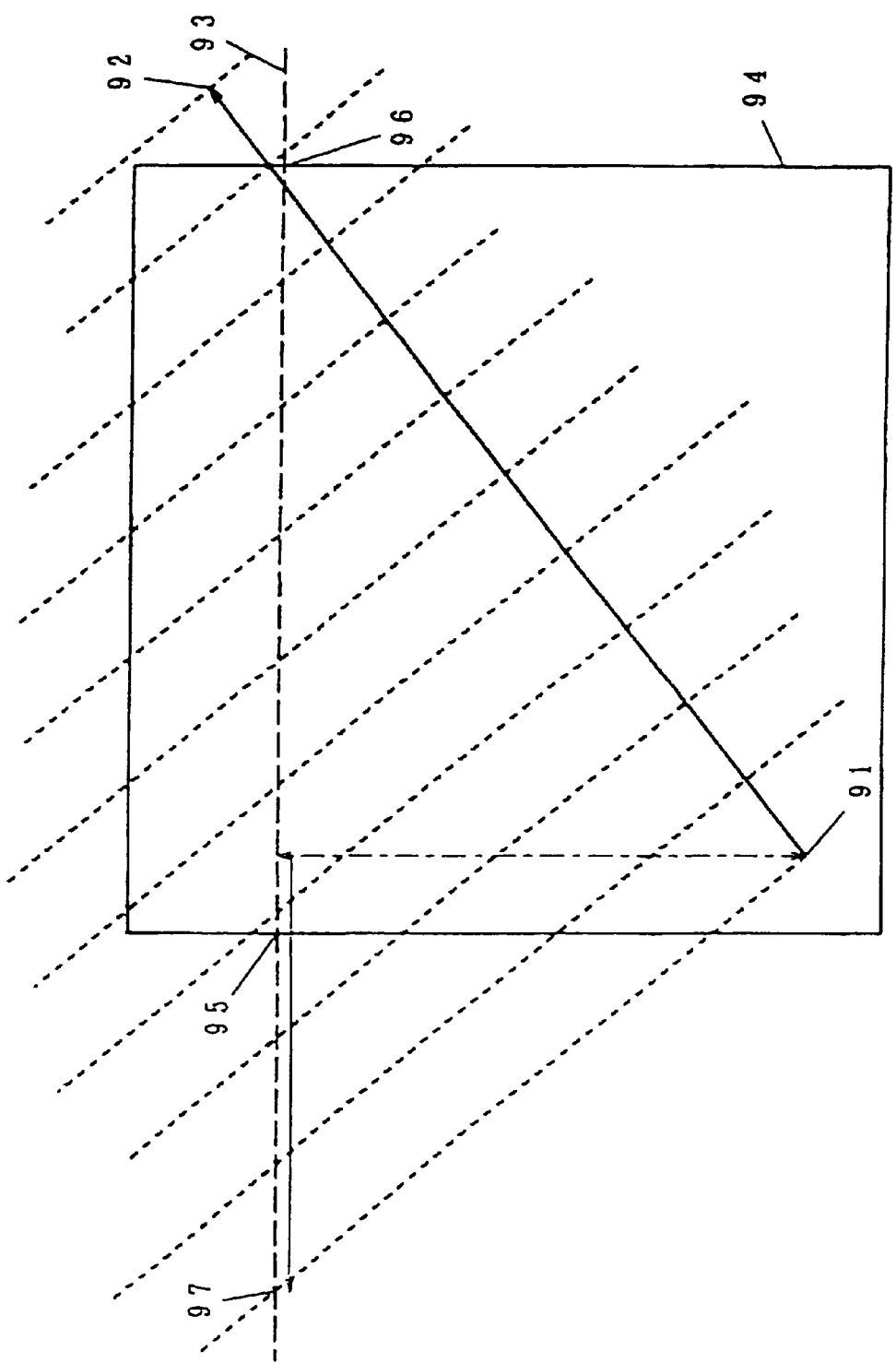
FIG. 10 is a diagram used to explain an operation of the gradation generation unit in the image forming apparatus according to the second embodiment of the present invention.

FIG. 9 is a flowchart showing an example of an operation of the gradation generation unit in the image forming apparatus according to the second embodiment of the present invention. In FIG. 10, reference numerals 91, 92 denote a gradation vector start point and a gradation vector end point, reference numeral 93 denotes a scanning line, reference numerals 95, 96 denote a drawing start point and a drawing end point, reference numeral 97 denotes an intersection point between a straight line crossing the gradation vector at a right angle through the point 91 and the scanning line 93, and reference numeral 98 denotes an intersection point between a perpendicular extending from the point 91 to the scanning line 93 and the scanning line 93, respectively.

Steps S81, S82 in FIG. 9 are similar to those of the above-mentioned example shown in FIG. 4, wherein color values at the gradation vector start point 91 and the gradation vector end point 92 are assumed to be $c_s$, $c_e$ and a normalized unit vector which results from dividing the gradation vector by the length of the gradation vector is assumed to be $e_g$. Also, the color unit width obtained when the color value is changed is assumed to be $\Delta c$. The number of N of the divided gradation vectors is obtained by calculating $(c_e-c_s)/\Delta c$, and the unit width $\Delta g$ of the gradation vector is calculated on the basis of the number N and the length of the gradation vector. Although all of the unit widths of the gradation vectors become the same according to this method, this width may be given by the user explicitly.

In the next steps S83, S84, the color value at the drawing start point 95 is calculated. To this end, a position at which the boundary of the band-like region crosses the scanning line 93 is calculated and may be compared with the coordinates of the drawing start point 95. Initially, at the step S83, there are calculated coordinates of the point 97 at which the boundary of the band-like region which passes the start point 91 of the gradation vector intersects the scanning line 93. The point 97 is the point at which a straight line passing the point 91 and perpendicular to the gradation vector intersects the scanning line. The y coordinate of the point 97 is the y coordinate value of the scanning line 93, and hence need not be calculated. The value of the x coordinate of the point 97 may be calculated by subtracting from the x coordinate of the point 97 a value which results from multiplying the distance between the point 91 and the scanning line 93 with a tangent of an angle formed by the gradation vector and the scanning line 93. Incidentally, the distance between the point 91 and the scanning line 93 can be obtained by the subtraction of the y coordinates.

Subsequently, it is possible to successively obtain coordinate values of the boundary of the band-like region on the scanning line 93 by successively adding to the coordinate values of the point 97 a value which results from multiplying the width of the band-like region on the gradation vector by the cosine of the angle formed by the gradation vector and the scanning line 93. In the step S84, a color value at the drawing start point 95 on the scanning line 93 is obtained by comparing these coordinate values with the coordinate values of the drawing start point 95 on the scanning line 93. The processing at a step S85 for obtaining the color changing point can be executed by continuing the processing in which a value which results from multiplying the width of the band-like region on the gradation vector by the cosine of the angle formed by the gradation vector and the scanning line 93. Then, the added result and the color value are added as the gradation patterns at a step S86. It is determined at the next decision step S87 whether or not the added result exceeds the drawing end point 96. If the added result exceeds the drawing end point 96 as represented by a YES at the decision step S87, then control goes to the next decision step S88. In the decision step S87, it is determined whether or not the processing of all scanning lines is finished. If a YES is outputted at the decision step S87, the processing for generating the gradation pattern in that scanning line is ended. The above-mentioned processing is executed on each scanning line. Since the processings on the respective scanning lines are independent, these processings may be executed in parallel to each other.

Figure 11:
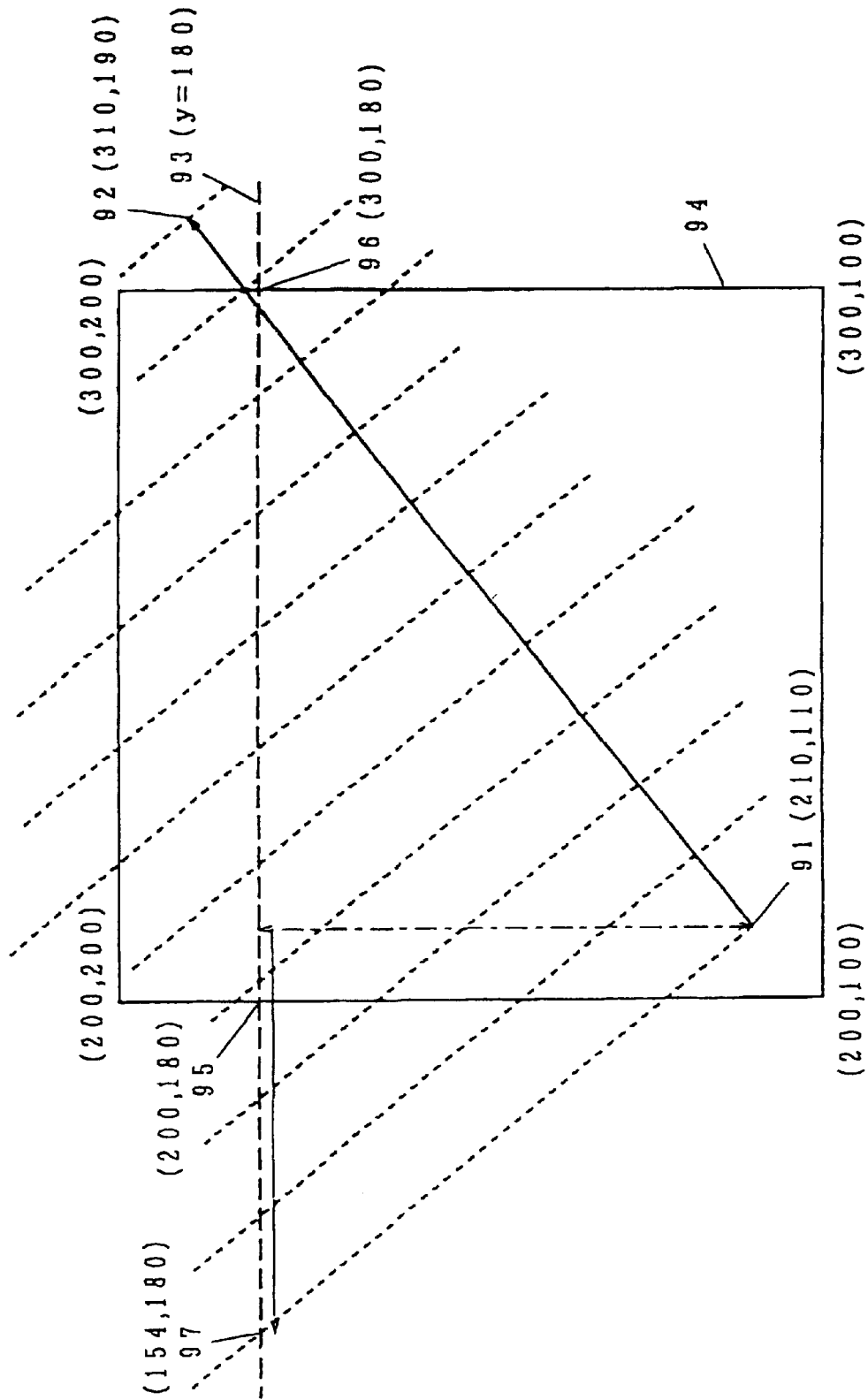
FIG. 11 is a diagram used to explain the manner in which a gradation pattern is generated in the image forming apparatus according to the second embodiment of the present invention.

FIG. 11 is a diagram used to explain a specific example of the gradation pattern generation processing in the image forming apparatus according to the second embodiment of the present invention. Here, let it be assumed that the print job shown in FIG. 7 is given. That is, the gradation is effected on a drawing region 94 which becomes a square in which an upper left vertex is (200, 200), a width is 100 and a height is 100. The gradation is such one band-like gradation that the start point of the gradation vector is (210, 110), the end point of the gradation vector is (310, 190) and colors at the respective points become (1.0, 0, 0), (0, 1.0, 0).

The print job is analyzed by the command analysis unit 11, and drawing data including the gradation data is transferred to the drawing data storage unit 12 and thereby stored. A drawing command is transferred to the drawing unit 13.

The drawing unit 13 executes the drawing processing with reference to the drawing data stored in the drawing data storage unit 12. Since the filling based on the band-like gradation is instructed, the gradation generation unit 14 is activated and the filling based on the gradation is executed. The gradation generation unit 14 receives the gradation data, generates the gradation pattern for each scanning line in accordance with the algorithm shown in FIG. 9, and stores the gradation patterns thus generated in the page buffer 15.

With respect to the scanning line 93 in which y=180 is satisfied, the drawing start point 95 becomes (200, 180). A distance between the gradation vector start point (210, 110) and the scanning line 93 is 70. Also, since a tangent of an angle formed by the gradation vector and the scanning line 93 is ⅘, a value 56 is obtained by multiplying the above-mentioned distance 70 by the tangent. A value 154 which results from subtracting this value 6 from the x coordinate of the drawing start point 95 becomes an x coordinate of the point 97 on the scanning line corresponding to the gradation vector start point 91. That is, the coordinates of the point 97 are (154, 180).

If the number of the divided gradation vector is obtained as 10 from the unit of color, then the unit width Δg on the gradation vector of the band-like region becomes $2\sqrt{41}$. A value 16.4 which results from multiplying the above unit width Δg by a reciprocal $\sqrt{41}/5$ of the cosine of the angle formed by the gradation vector and the scanning line 93 becomes a distance ranging from the intersection point between the boundary of the band-like region and the scanning line 93 to the boundary of the next band-like region in the direction of the scanning line 93. By successively adding this value to the x coordinate of the point 97, there can be successively obtained sequences 154, 170.4, 186.8, 203.2 of the x coordinate of the color changing point. Each time these color changing points are obtained, they are compared with the coordinates of the drawing start point 95. Thus, it is to be understood that the drawing start point belongs to the third band-like region. Moreover, the color value at the drawing start point 95 becomes (0.2, 0.8, 0).

The succeeding color changing points can be successively obtained by repeating the processing for adding the distance 16.4 up to the boundary of the next band-like region. Each tome the color changing point is obtained, the color changing point thus obtained is compared with the drawing end point 96. At the time point the compared result exceeds the drawing end point 96, the gradation pattern generation processing of the scanning line 93 in which y=180 is satisfied is completed. When this processing is executed on each scanning line, the gradation pattern within the drawing area 94 is generated and accumulated in the page buffer 15. When the print instruction is issued, the content of the page buffer 15 is supplied to the print engine 4 and thereby printed.

As described above, according to the second embodiment, since the same graphic form for expressing the gradation need not be drawn repeatedly and the expansion of the gradation pattern can be limited to the inside of the drawing target region, the gradation can be drawn at high speed.

Figure 12:
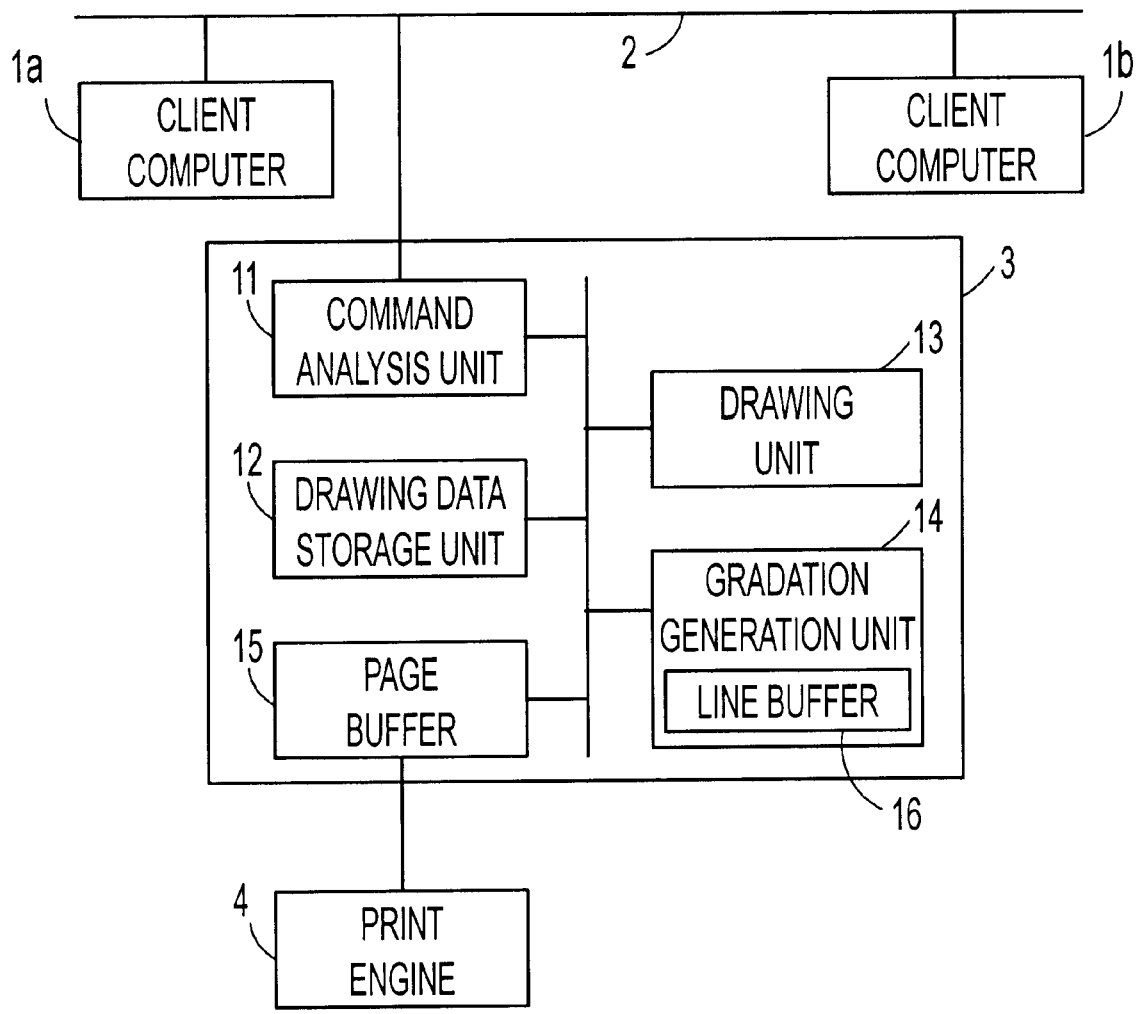
FIG. 12 is a block diagram showing an example of a system structure including an image forming apparatus according to a third embodiment of the present invention.

FIG. 12 is a block diagram showing a system including an image forming apparatus according to a third embodiment of the present invention. In FIG. 12, elements and parts identical to those of FIG. 1 are marked with the same references and therefore need not be described. In FIG. 12, reference numeral 12 designates a line buffer. The gradation generation unit 14 generates gradation by using information which is accessed from the drawing unit 13 and stored in the drawing data storage unit 12. In the third embodiment, the gradation generation unit 14 includes the line buffer 16 disposed therein. When generating the gradation, the gradation generation unit 14 previously expands the gradation pattern of one scanning line and stores the expanded gradation pattern in this line buffer 16. Thereafter, in each scanning line, the color at the drawing start point and the distance up to the next color changing point are calculated similarly to the first embodiment. Thereafter, the gradation generation unit 14 copies the content of the line buffer 16 and generates the gradation pattern.

Figure 13:
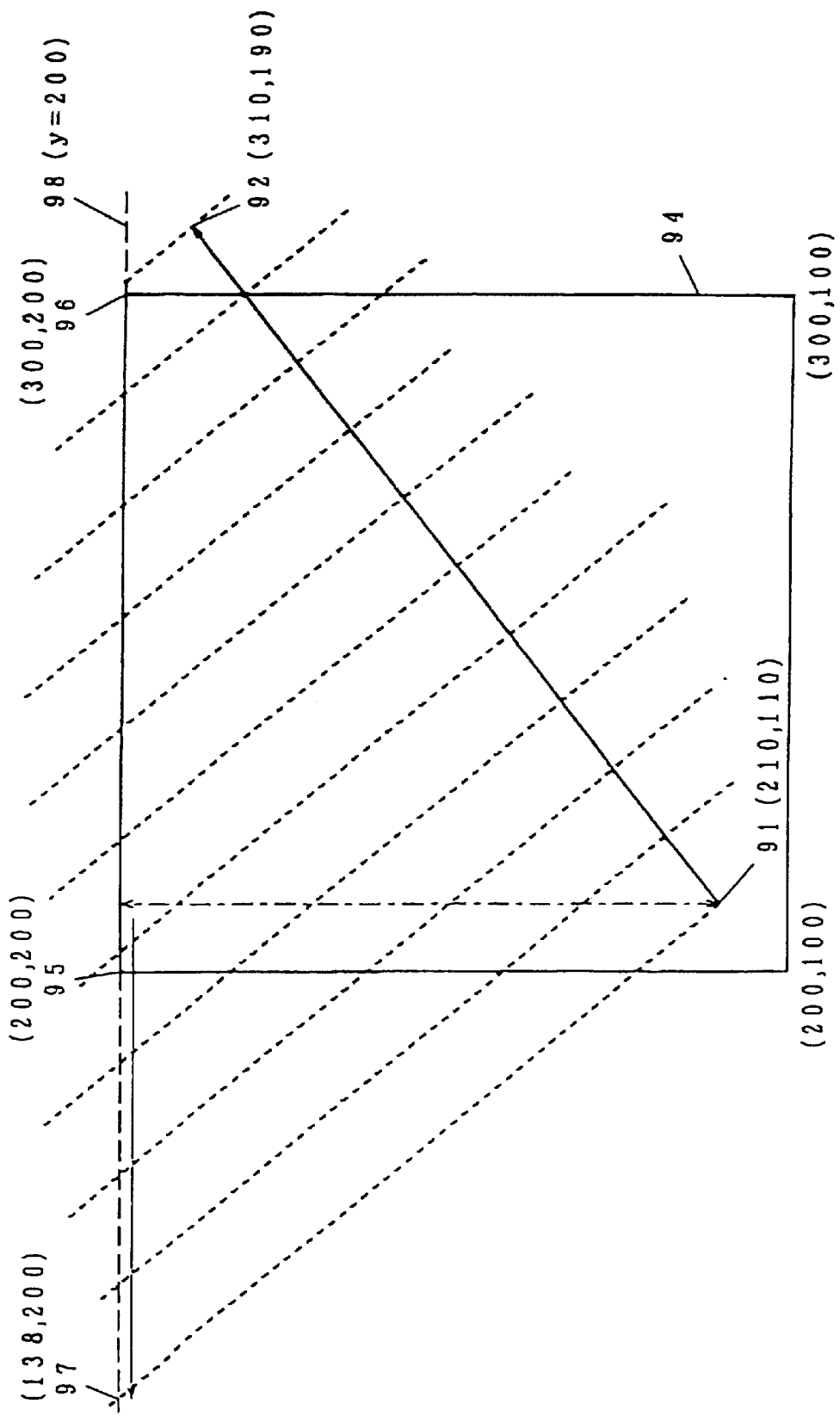
FIG. 13 is a diagram used to explain the manner in which a gradation pattern is generated in the image forming apparatus according to the third embodiment of the present invention.

FIG. 13 is a diagram used to explain the gradation pattern generation processing in the image forming apparatus according to the third embodiment of the present invention. Here, let it be assumed that the print job shown in FIG. 7 is issued, coordinates of a point at which the boundary of the band-like region passing the gradation vector crosses the scanning line is calculated, and the gradation pattern is generated by the method in which color changing points are successively obtained similarly to the above-mentioned second embodiment.

Let us describe the case in which a scanning line for generating the gradation pattern within the drawing area 94 first is presented as y=200. With respect to a scanning line 98 in which y=200 is satisfied, the drawing start point becomes (200, 200). A value 72 is obtained by multiplying a value 90 between a gradation vector start point (210, 110) and the scanning line 98 by a tangent ⅘ of an angle formed by the gradation vector and the scanning line 98, and an x coordinate 138 of the point 97 on the scanning line corresponding to the gradation vector is obtained by subtracting this value 72 from the value 210 of the x coordinate of the drawing start point 95.

Assuming that the number of the divided gradation vectors is 10 from the color unit, then the unit width becomes $2\sqrt{\{41\}}$, and a value 16.4 which results from multiplying this value by a reciprocal number $\sqrt{\{41\}}/5$ of the cosine of the angle formed by the gradation vector and the scanning line 98 becomes a distance up to the next color changing point on the scanning line. By adding this value to the coordinates values of the point 97, there can be successively obtained sequences 138, 154.4, 170.8, 187.2, 203.6, . . . of the color changing points. At that time, a distance between the color changing points is calculated and successively stored in the line buffer 16. Also, each time the color changing point is obtained, the color changing point thus obtained is compared with the coordinates of the drawing start point 95, thereby resulting in the band-like region to which the drawing start point 95 belongs being obtained. In this example, the drawing start point 95 belongs the fourth band-like region and the color value becomes (0.3, 0.7, 0).

Thereafter, the processing for adding the distance up to the color changing point to the coordinate values, and color changing points and color values are calculated and added as the gradation patterns. Also, each time the color changing point is calculated, the distance between the color changing points is calculated and successively stored in the line buffer 16. Further, the color changing point thus calculated and the drawing end point 96 are compared with each other. When the compared result exceeds the drawing end point, the gradation pattern up to the drawing end point 96 is added, and the generation of the gradation pattern in the scanning line in which y=200 is completed.

Figure 14:
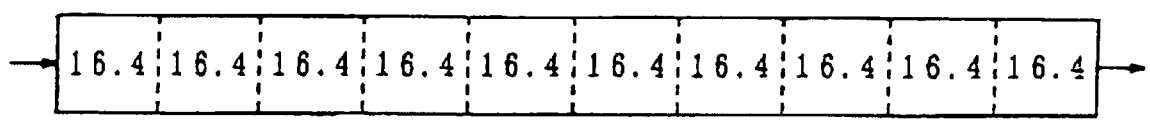
FIG. 14 is a diagram used to explain an example of contents of a line buffer in the specific example of the manner in which the gradation pattern is generated in the image forming apparatus according to the third embodiment of the present invention.

FIG. 14 is a diagram used to explain an example of contents of the line buffer 16 in the specific example of the gradation pattern generation processing in the image forming apparatus according to the third embodiment of the present invention. By successively storing the distance between the color changing points in the line buffer 16, data shown in FIG. 14 is stored. In this example, since the distance between the respective band-like region, i.e. unit width is made constant, the distances between the color changing points stored in the line buffer 16 are all the same value. According to the present invention, this arrangement may be applied to the case in which the distance between the band-like regions is changed or given arbitrarily.

If the number of the divided gradation vectors is not satisfied even after the distance between the color changing point up to the drawing end point is calculated, then the processing in which the distance between the color changing points is stored in the line buffer 16 is continued, and all distances between the color changing points corresponding to the distances from the gradation vector start point to the gradation vector end point may all be calculated. While the distance between the color changing points is successively stored in the line buffer 16 when the gradation pattern of the first scanning line is generated as described above, the present invention is not limited thereto, and the width of each band-like region is detected from the gradation data so that such width may be converted into the value of the scanning direction in advance and stored in the line buffer 16.

In order to generate the gradation patterns with respect to the succeeding scanning lines by using the distance between the color changing points stored in the line buffer 16, an x coordinate of a point on the scanning line corresponding to the gradation vector start point is calculated and the values stored in the line buffer 16 are successively added to the coordinate value. In the process of the addition, the band-like region to which the drawing start point belongs is specified and the color value is calculated. Thereafter, while the gradation pattern is generated, if it is determined whether or not the color value thus calculated reaches the drawing end point. If the color value reaches the drawing end point, then the generation of the gradation pattern in the scanning line is ended. In this way, gradation patterns with respect to all scanning lines included in the drawing region 94 are generated and accumulated in the page buffer 15. When a print instruction is issued, the content of the page buffer 15 is transferred to the print engine 4 and thereby printed.

By using the arrangement shown in the third embodiment, only one calculation concerning the repetition of the same pattern can be made sufficient so that the gradation pattern may be generated at high speed. Moreover, since only the content of the line buffer 15 is referred to, an exclusive control of resource need not be carried out also in the parallel processing, and the efficient operation can be realized.

Incidentally, while only the portion on which the gradation is effected in the drawing region was described in the respective specific examples in the first to third embodiments, in FIGS. 5 and 10, for example, the gradation is not designated in the portion near the origin rather than the start point of the gradation vector. Such portion may exist within such drawing region, and an ordinary filling processing may be effected in such portion. Moreover, the gradation vectors need not be designated on the drawing region in such a superimposing fashion like these examples, and can be designated arbitrarily.

Other embodiment of the present invention will be described with reference to the drawings.

Figure 15:
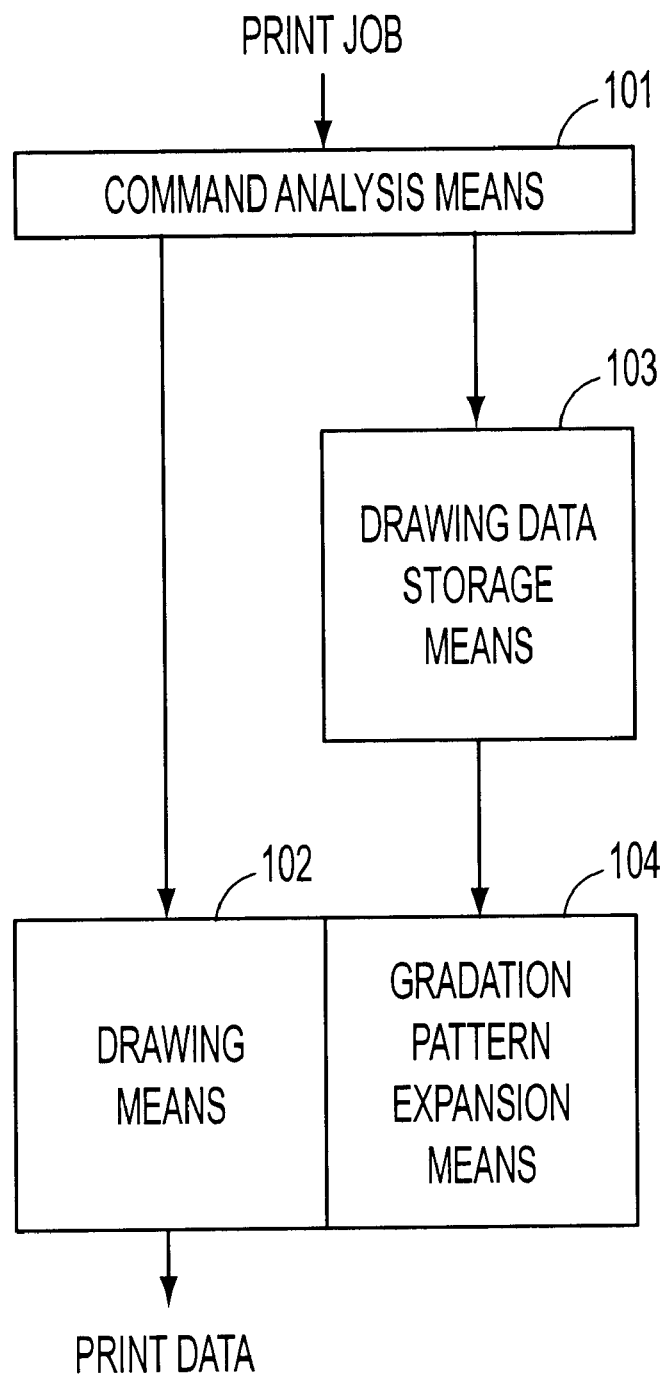
FIG. 15 is a functional block diagram showing a principle of an image forming apparatus according to the present invention.

FIG. 15 is a block diagram used to explain the principle of the image forming apparatus according to the present invention. The image forming apparatus according to the present invention comprises a command analysis means 101 for analyzing an inputted print job, a drawing means 102 for executing the drawing processing in accordance with the analyzed drawing command, a drawing data storage means 103 for storing drawing data which becomes parameters of a drawing command, and a gradation pattern expansion means 104 for expanding a gradation pattern based on gradation pattern necessary for expressing the gradation stored in the drawing data storage means 103.

Gradation information, i.e. drawing data which is analyzed by the command analysis means 101, preserved in the drawing data storage means 3, and required to express concentric gradation comprises two points expressing end points of a vector corresponding to the color changing direction, color values at the positions of the two points, shapes of unit gradation patterns, and a distance between the unit gradation patterns. The end points of the vector of the color changing direction may be supplied by the coordinate values and need not always be included in the drawing region. The color values are the coordinate values in the color spaces such as RGB and YMCK. The shape of the unit gradation pattern is the concentric shape surrounded by two concentric circles having radiuses in the vector direction expressing the color changing direction. The distance between the unit gradation patterns is a distance used when the pattern is disposed in the color changing direction, and there may be used a sequence of constant fixed values or fluctuating values.

The gradation pattern expansion means 103 scans scanning lines included in the gradation drawing region and calculates the sequences of the color changing position from the drawing region start position to the drawing region end position on the scanning line and the color values, thereby resulting in the pixel sequences or run-length expression of pixel value being generated.

In order to calculate the color value at the drawing start position on the scanning line, the length of the radius connecting the center of the concentric circle and the drawing start position on the scanning line is calculated and compared with the distance between the unit gradation patterns. Then, the concentric region to which such a point belongs is judged. When the distance between the unit gradation patterns is a fixed value, if the ratio between the length of the calculated radius and the fixed value is calculated, then it is possible to easily judge the concentric region to which the point belong. When the distance between the unit gradation patterns is given in the form of the sequence of fluctuating values, it is possible to obtain a similar result by comparing the accumulated value with the length of the radius. The color value at that time may easily be obtained by using the increased amount of the color value which results from equally dividing the difference between the initially supplied two color values. The color changing position on the succeeding scanning lines is the intersection point between the boundary of the concentric region and the scanning line, and this will be calculated as follows. Initially, a sequence of a radius of a concentric circle is calculated from the distance between the unit gradation patterns, and next, a distance between the center of the concentric circle and the scanning line is calculated. This is equal to a length of two sides of a right-angled triangle comprising a radius connecting the color changing position on the scanning line and the center of the concentric circle, a line extending from the center of the concentric circle to the perpendicular direction, and the scanning line. If a length of remaining one side of the right-angled triangle is calculated by using Pythagorean theorem, then it is possible to obtain a distance up to the color changing position on the scanning line. Thus, it is possible to successively obtain a sequence of color changing positions on the scanning line by successively adding the thus calculated distance to the coordinate value.

The gradation pattern thus generated contains information of the color values and the color changing positions and the sequence of the pixel values or the run-length format may be generated without using a special method. Moreover, in the gradation pattern generation process, such data of such system may be generated directly.

The image forming apparatus which is applied to the print system connected to the network according to a first embodiment of the present invention will be described next in detail.

Figure 16:
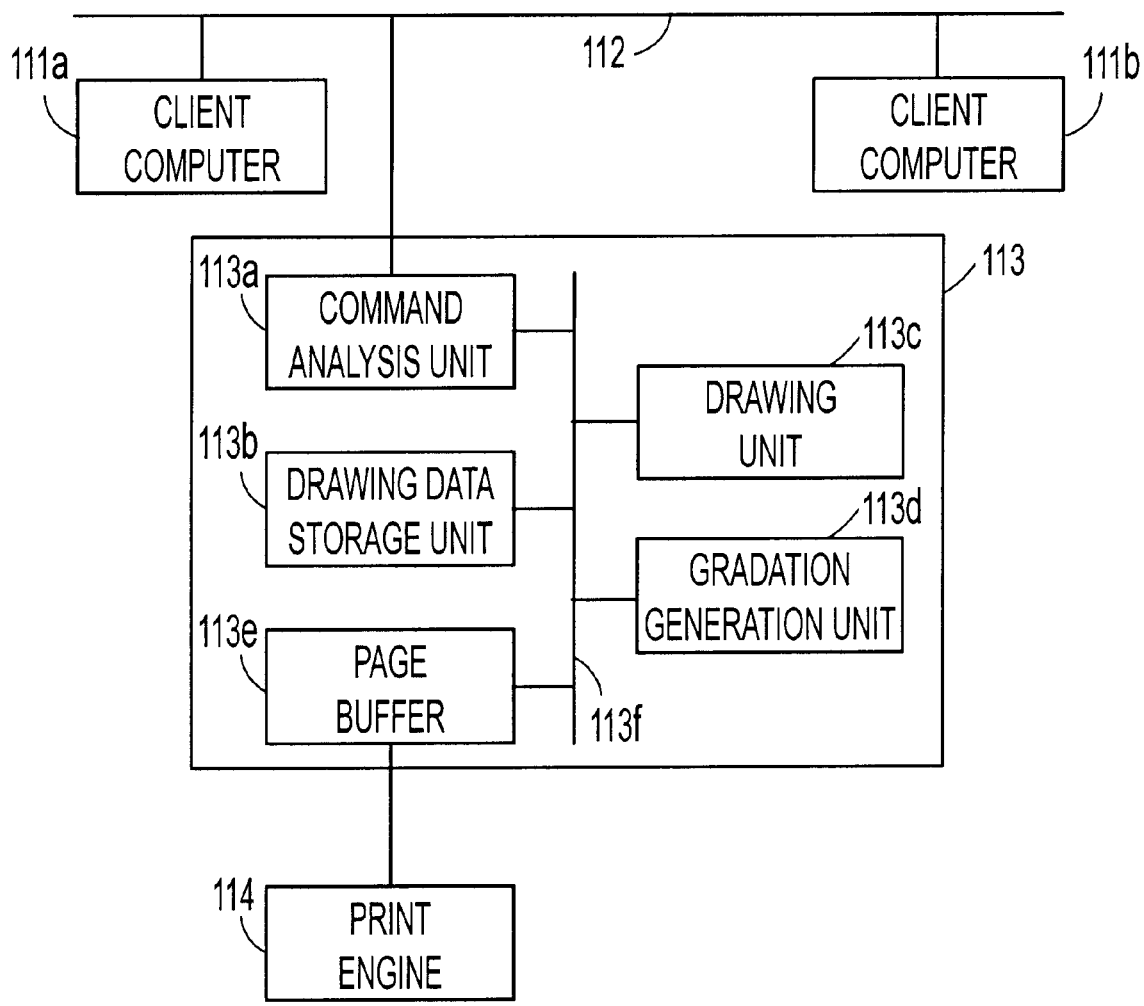
FIG. 16 is a diagram showing a structural example of a network print system.

FIG. 16 is a block diagram showing an example of a network print system. A plurality of client computers, in the illustrated example, two client computers 111*a*, 111*b* having document composition software and which issue print jobs of composed documents are connected to a network 112. An image forming apparatus 113 is connected to the network 112. This image forming apparatus 113 includes a command analysis unit 113*a* connected to the network 112, a drawing data storage unit 113*b*, a drawing unit 113*c*, a gradation generation unit 113*d* and a page buffer 113*e* which are connected to each other via a bus 113*f*. The page buffer 113*e* is connected to a print engine 114.

The print job created by the client computers 111*a*, 111*b* is transferred through the network 112 to the command analysis unit 113*a*. The command analysis unit 113*a* interprets the content of the received print job and classifies the content of the received print job to provide drawing data and a drawing command. The drawing data comprises shape data of drawn graphic form and attribute data such as color and stroke width, both of which are accumulated in the drawing data storage unit 113*b*. Also, if a gradation is designated, then information thereof also is accumulated in the drawing data storage unit 113*b*. When the drawing command is detected by the command analysis unit 113*a*, the detected drawing command is supplied to the drawing unit 113*c*. In the drawing unit 113*c*, the drawing command executes the drawing with reference to the drawing data accumulated in the drawing data storage unit 113*b*. At that time, the drawing data thus referred to is deleted from the drawing data storage unit 113*b*. If the gradation is designated for the drawing data, then the gradation generation unit 13*d* provided as a part of the function of the drawing unit 113*c* generates a gradation by using the drawing data accumulated in the drawing data storage unit 113*b*. If the gradation is not designated, then the drawing unit 113*c* executes the drawing processing similarly to the ordinary page description language processing system. The drawn result of the drawing unit 113*c* is transferred to the page buffer 113*e*, in which it is transferred to the print engine 114 and thereby printed when data of one page is generated.

Figure 17:
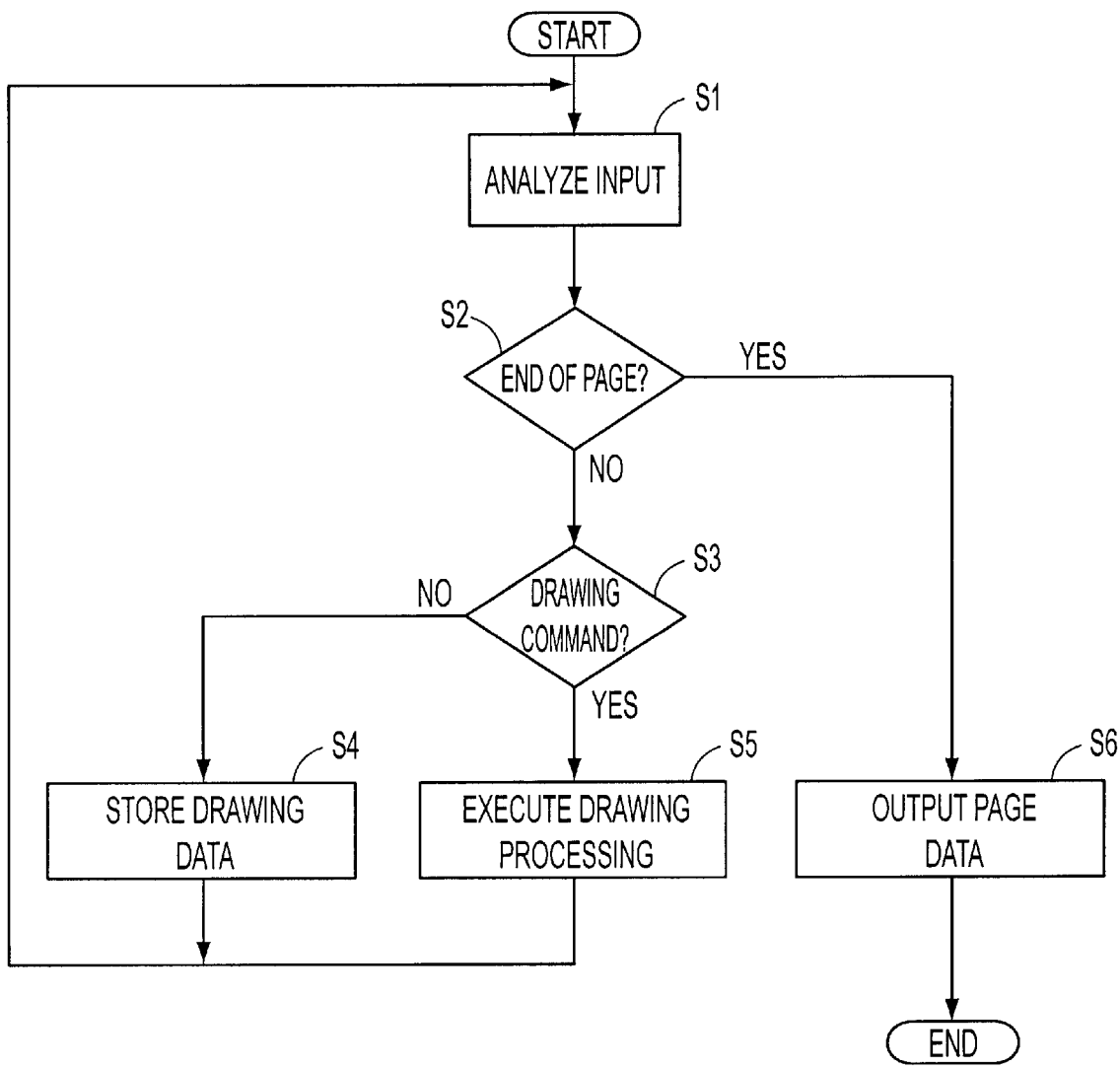
FIG. 17 is a flowchart showing a flow of processing carried out by the image forming apparatus.

FIG. 17 is a flowchart showing the flow of the processing done by the image forming apparatus. Referring to FIG. 17, and following the start of operation, when a print job is inputted, the command analysis unit 113*a* analyzes the inputted print job as a page description language command (step S1). Then, it is determined whether or not the inputted data represents the page end (step S2). If the inputted data is not the page end, then it is determined whether or not the inputted data is a drawing command (step S3). If the inputted data is not the drawing command, then it is determined that the inputted data is the drawing data. Thus, the inputted data is saved in the drawing data storage unit 113b (step S4). The drawing data includes attribute data such as colors and stroke widths in addition to shape data representing the shape of the graphic form. After the drawing data is saved in the drawing data storage unit 113b, control goes back to step S1. In this way, when the save operation is repeated and necessary drawing data is accumulated in the drawing data storage unit 113b, then the drawing command is inputted. As the drawing command, there are used "fill" which fills the graphic form and "stroke" which executes the contour drawing. If it is determined that the inputted data is the drawing command, then such drawing command is supplied to the drawing unit 113c. Then, the drawing unit 113c executes the drawing processing such as the filling with reference to the saved shape data and the saved drawing data of the attribute data (step S5). After the drawing processing is executed, control goes back to the step S1. When the inputted data completes the drawing processing up to the page end, data of drawn one page is outputted from the page buffer 113e to the print engine 114 (step S6).

The image forming apparatus according to the present invention will be described below more in detail with reference to specific commands.

Figure 18:
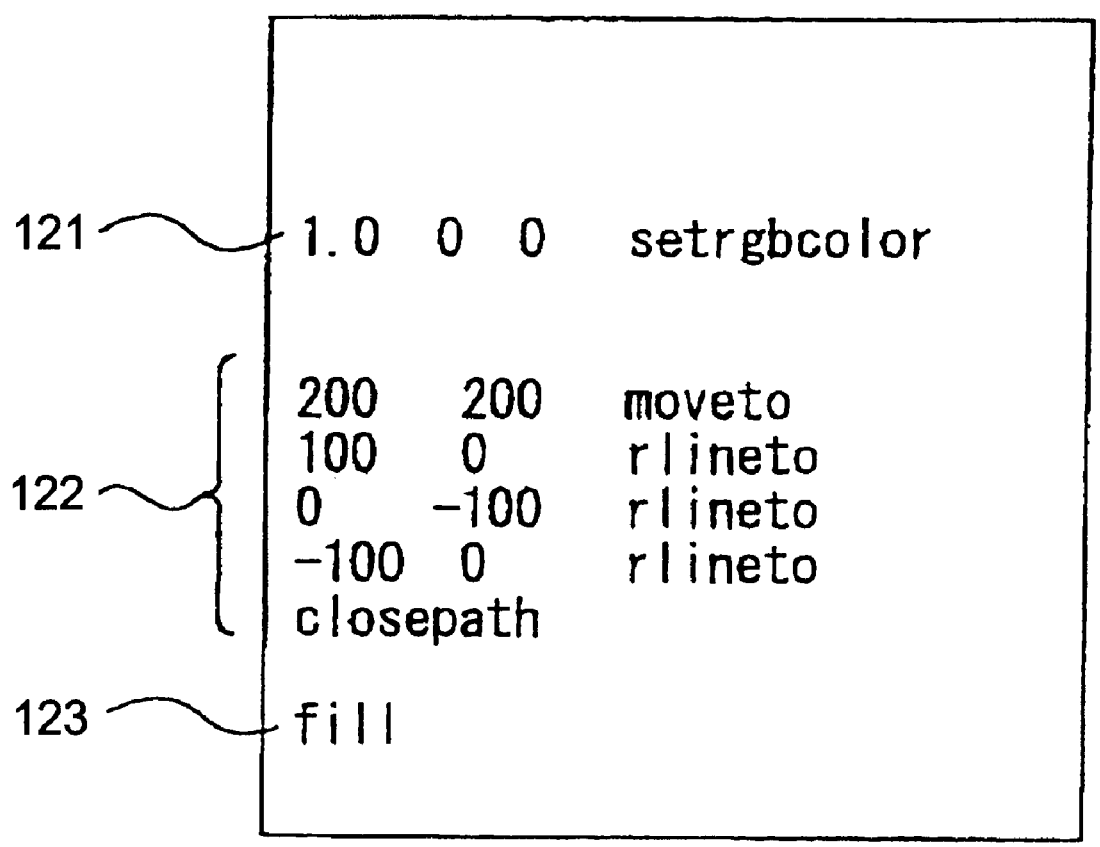
FIG. 18 is a diagram showing an example of a page description language entered into the image forming apparatus.

FIG. 18 is a diagram showing an example of a page description language inputted to the image forming apparatus. An example of the description shown in FIG. 18 is a description written in accordance with a grammar of PostScript (trademark and registered trademark of Adobe Systems Inc. and subsidiary companies of Adobe Systems Inc. in foreign countries). Initially, a description 121 designates data in such a manner that a value obtained when a color is expressed in the RGB system is saved. A description 22 is a description for designating the shape of graphic form, and designates a square graphic form in this example. These descriptions 21, 22 comprise drawing data, and a drawing command description 23 is designated after designation of the descriptions 21, 22. In this example, "fill" which fills the graphic form is designated as the drawing command. When the page description language thus described is inputted to the command analysis unit 113a of the image forming apparatus 113, the command analysis unit 113a executes a processing shown in FIG. 19.

Figure 19:
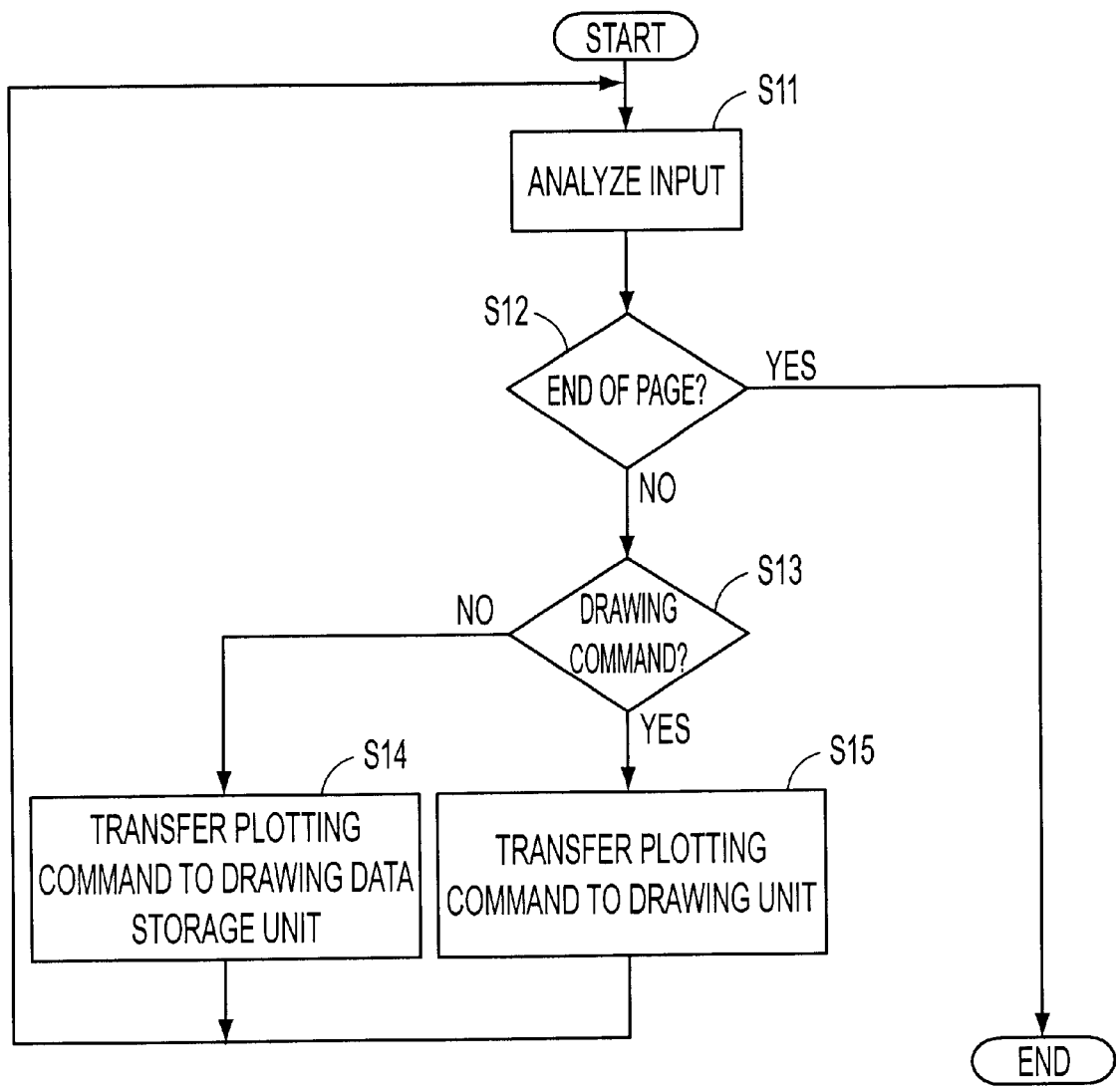
FIG. 19 is a flowchart showing a flow of processing carried out by the command analysis unit.

FIG. 19 is a flowchart showing the flow of the processing done by the command analysis unit 113a. Referring to FIG. 19, and following the start of operation, when the page description language shown in FIG. 18 is inputted, the command analysis 113a analyzes inputted data in the order of inputs, and divides the inputted data into proper units of inputs 21, 22, 23 (step S11). Then, it is determined whether or not the inputted data is the page end (step S12). If the inputted data is the page end, the processing of the command analysis unit 113a is ended. If the inputted data is not the page end, then it is determined whether or not the inputted data of the divided unit is the drawing command (step S13). If the inputted data is not the drawing command, then the inputted data is transferred to the drawing data storage unit 113b and accumulated therein (step S14). Thereafter, control goes back to the step S11, and the accumulation of the drawing data is repeated until the next drawing command is inputted. If the inputted data is the drawing command, then such inputted data is transferred to the drawing unit 113c.

In this manner, the drawing data storage unit 113b holds the drawing data supplied from the command analysis unit 113a, and transfers the drawing data thus held in response to the request from the drawing unit 113c when the command is executed. Also, when the drawing data is transferred to the drawing unit 113c, the data held in the drawing data storage unit 113b is not saved. As a result, when the drawing data executes the drawing, it appears that data in the drawing data storage unit 113b is consumed.

Figure 20:
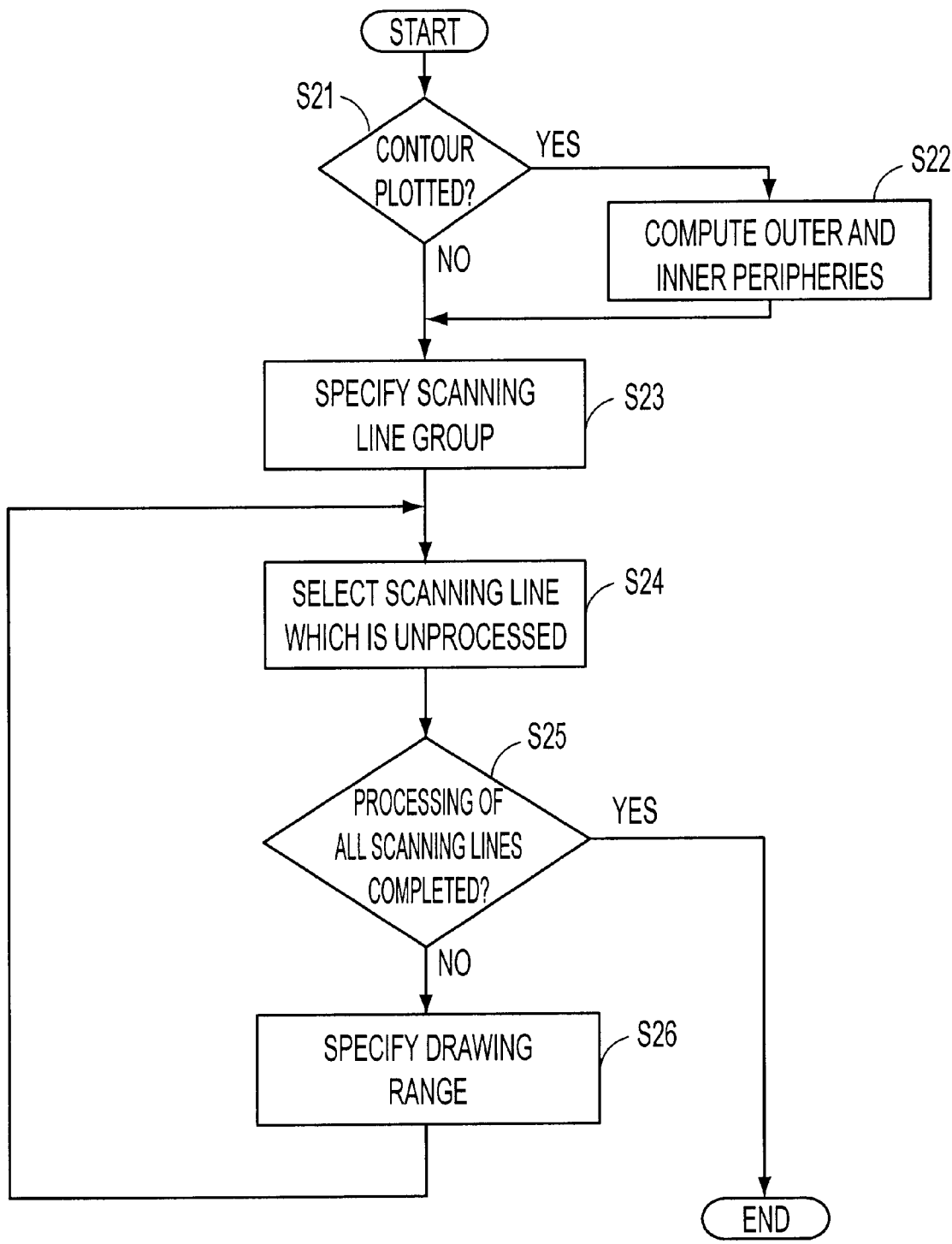
FIG. 20 is a flowchart showing a flow of general graphic processing carried out by the drawing unit.

FIG. 20 is a flowchart showing the flow of a general graphics processing done by the drawing unit. Referring to FIG. 20, and following the start of operation, when the drawing unit 113c receives the drawing command from the command analysis unit 113a, it is determined whether or not the drawing command is a "stroke" command which instructs a contour drawing (step S21). If the drawing command is the "stroke" command, then a line having a width (stroke) should be drawn and lines of the outer and inner peripheries corresponding to the outside and inside of the stroke are calculated (step S22). Thus, the contour for actually executing the filling processing is calculated, and the contour drawing command converts the data into the same data used in the filling command. Then, a range of scanning lines which the graphic form crosses is calculated based on the shape data of the drawn graphic form, and a scanning line group necessary for the filling processing is specified (step S23). One scanning line is selected from the specified scanning line group (step S24). Then, it is determined whether or not the processing of all scanning lines is completed and the scanning line which is unprocessed is selected (step S25). If the scanning line which is unprocessed is selected, then the range in which the drawn graphic form crosses the scanning line and which is necessary for the filling processing is specified (step S26). When the drawing range is specified, the data is transferred to the page buffer 113e, and filling color information is disposed in the drawn graphic form existing range in the processed scanning line. At that time, if the page buffer is comprised of the arrangement of the pixel values, color values are disposed on the memory. If the page buffer is of the pixel value run-length system, the run start point and the run length are calculated from the graphic form existing range on the scanning line, and the run start point and the run length form run information together with the color values and then added. Thereafter, control goes back to the step S24, and this drawing range specifying processing is repeatedly executed on all scanning lines that were specified at the step S23. If it is determined at the next decision step S25 that the processing of all scanning lines is completed, then this processing is ended. As described above, when the "stroke" command for instructing the contour drawing is issued, the drawing boundary corresponding to the inside and outside of the line is calculated by using the stroke information, and thereafter, processing similar to that executed when the "fill" command for instructing the filling is executed.

When the drawing based on the gradation is instructed, the gradation generation unit 113d receives the gradation data from the drawing data storage unit 113b, and the above-mentioned drawing unit 113c executes the filling processing in the drawn graphic form existing range on the scanning line.

Figure 21:
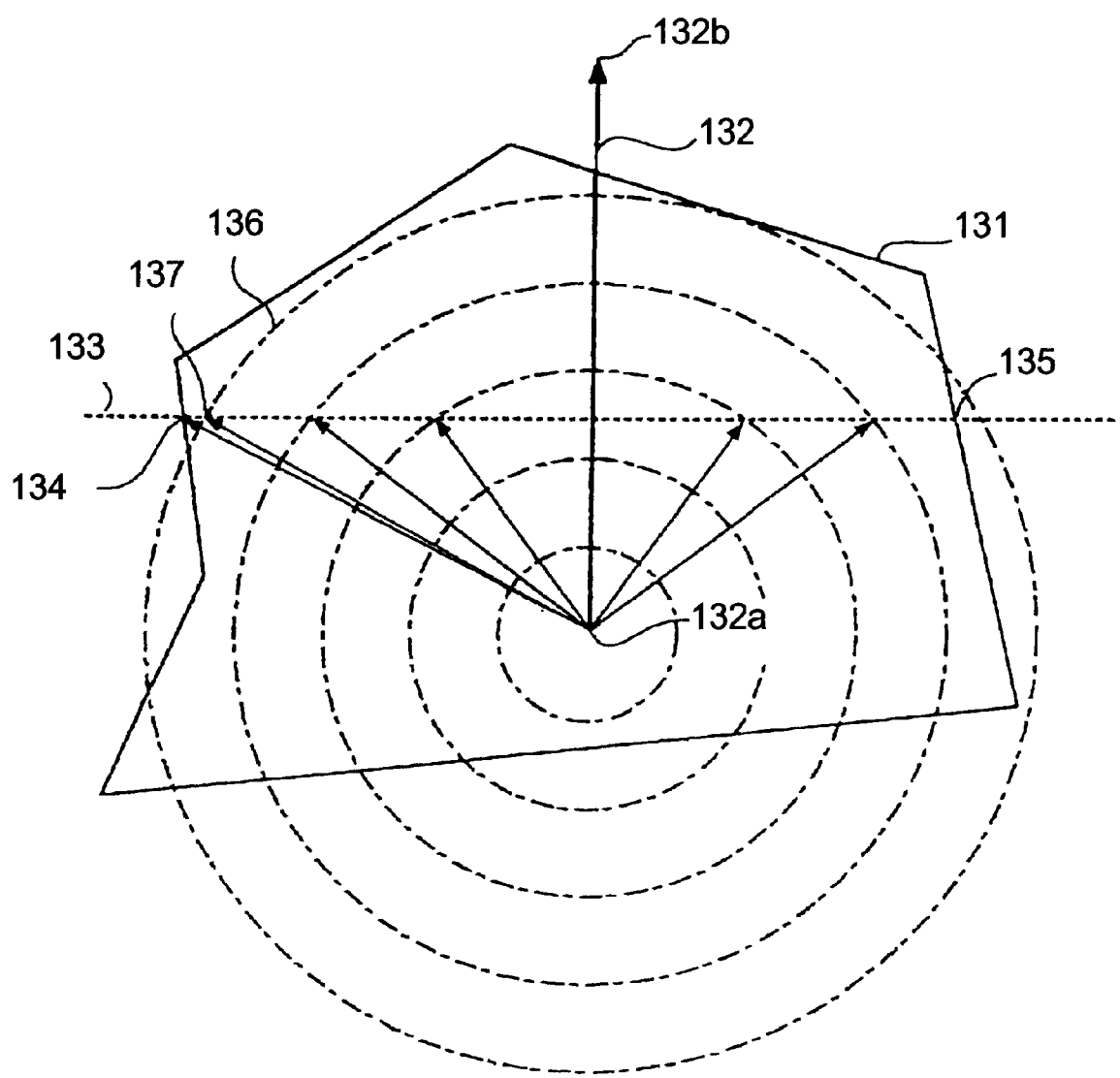
FIG. 21 is a diagram used to explain the manner in which a concentric gradation pattern is generated.

FIG. 21 shows the case in which the shape of the gradation pattern is the concentric circle. FIG. 21 is a diagram used to explain the manner in which the gradation pattern of the concentric circle is generated. FIG. 21 shows the case in which gradation whose color is changed in a concentric circle fashion is drawn in a drawn graphic form 131. A direction in which the color is changed from the center of the concentric circle is called a gradation vector and designated by reference numeral 132. This gradation vector 132 is designated by coordinates of both end points of a vector start point 132a and a vector end point 132b. Since the concentric circle has no meaning with respect to the direction, the gradation vector 132 may be designated by the center coordinates of the concentric circle and the length of the radius. Also, while the gradation vector 132 is directed in the upper perpendicular for simplicity, a vector directed in an arbitrary direction may easily be converted into the vector of the upper perpendicular by rotating the vector if the length of the vector is clear. Color values at the start point 132*a* and the end point 132*b* of the gradation vector 132 are assumed to be $c_s$, $c_e$, and the unit width obtained when the color value is changed is assumed to be $\Delta c$. The value of the unit width $\Delta c$ may be selected in such a manner that the change of the color seems to be smooth in consideration of man's perception, the features of the color space used and a color reproduction ability of an output device. If $(c_s-c_e)/\Delta c$ is calculated, then the divided number N of the gradation vector 132 is obtained. Then, the unit width $\Delta g$ of the gradation vector 132 is calculated based on the divided number N and the length of the gradation vector 132. While all of the unit widths $\Delta g$ of the gradation vector 132 become the same according to this method, this width may be given by the user explicitly.

In the drawn graphic form 131, the filling processing ranges done by respective colors are specified with respect to the scanning line 133. Of the intersection points between the scanning line 133 and the drawn graphic form 131, the left-most intersection point 134 becomes the drawing start point and the right-most intersection point 135 becomes the drawing end point. If a distance between the intersection point 134 and the center (start point 132*a*) of the concentric circle of the gradation pattern is calculated and compared with the unit width $\Delta g$, a value n which indicates the concentric circle to which the intersection point 134 of the drawing start point belongs is obtained, whereby the color value at the intersection point 134 is calculated. The next color changing point on the scanning line 133 is the intersection point 137 between the next concentric circle 136 and the scanning line 133, and this may be easily obtained by using a square root of a value which results from subtracting a square of a distance between the scanning line 133 and the center (start point 132*a*) of the concentric circle from the square of the radius of the concentric circle 136 and coordinate values of the center (132*a*) of the concentric circle. With respect to the color value at that position, the succeeding color value may be calculated based on the previously-calculated color value of the intersection point 134. Coordinates at the intersection point with other concentric circle also are calculated similarly, and the gradation pattern relative to the scanning line 133 is generated by repeating this calculation until the circle exceeds the intersection point 135 which is the drawing end point.

Next, the manner in which the drawing range on each scanning line is specified by the gradation generation unit 113*d* will be described below.

Figure 22:
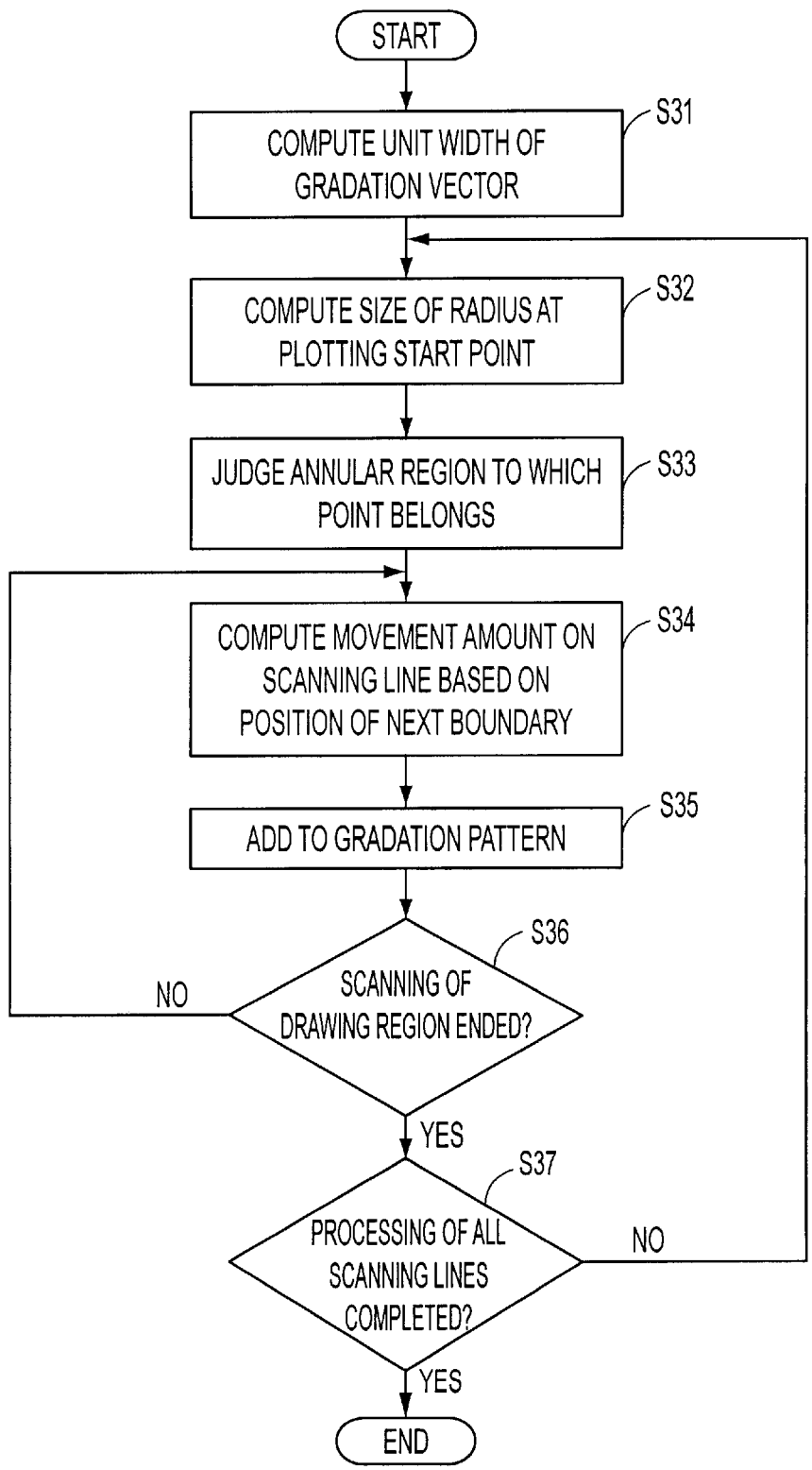
FIG. 22 is a flowchart showing a flow of processing done by the gradation generation unit.

FIG. 22 is a flowchart showing the flow of the processing done by the gradation generation unit 113*d*. Referring to FIG. 22, and following the start of operation, initially, the unit width $\Delta g$ of the gradation vector 132 is calculated (step S31). This unit width $\Delta g$ may be explicitly designated by the user or may be a value calculated by the system. Then, the size of the concentric circle at the drawing start point, i.e. a length corresponding to a distance between the intersection point 134 of the drawing start point in the scanning line 133 and the start point 132*a* of the gradation vector 132 is calculated (step S32). The concentric region to which the drawing start point belongs is calculated based on the calculated length, whereby the color value at that position is obtained (step S33). Then, a distance on the scanning line 133 from the processing target intersection point to the next color changing intersection point, i.e. a movement amount is calculated (step S34). The movement amount thus calculated is added to the gradation pattern as distance information of the color changing points between the drawing start point and the drawing end point on the scanning line 133 (step S35). Then, it is determined whether or not the calculated movement amount on the processing target scanning line 133 exceeds the drawing end point (step S36). If the scanning of the drawing region is not ended, then control goes back to the step S34, wherein the calculation of the movement amount up to the next color changing intersection point is continued. The reason that control goes back to the step S34 will be described below. In the gradation processing, since it is assumed that the colors are changed in the sequential order, the next drawn color is known in advance so that the concentric region to which the intersection point belongs is not judged but only the calculation of the movement amount is executed until the drawing region is ended. If it is determined at the decision step S36 that the calculation of the movement amount within the drawn region on the processing target scanning line 133 is ended, then it is determined whether or not the processing concerning all scanning line groups which intersect the drawn graphic form 131 specified in advance is ended (step S37). If there remains the scanning line in which the processing is not yet ended, then control goes back to the step S32, whereat the calculation of the distance between the drawing start point on the next scanning line and the center of the concentric circle is started. If the processing on all scanning lines is ended, then this processing is ended.

The gradation pattern thus generated is accumulated in the page buffer 113*e*, and supplied to and printed by the print engine 114 when the print is instructed.

Then, the manner in which the image forming apparatus is operated when the above-mentioned processing is applied to inputted data shown in FIG. 23 will be described.

FIG. 23 is a diagram showing an example of a gradation designating page description language inputted to the image forming apparatus. In FIG. 23, a description 141 of the portion encircled by a double inequality sign is a description which supplies parameters necessary for describing the gradation. The gradation is designated by a description 142 which is composed of "setgrad". In the description 141, the concentric circle gradation in "GType" is designated by "circle", and "StartPoint" designates the fact that the coordinates of the gradation vector start point are (290, 110), "EndPoint" designates the fact that the coordinates of the end point are (290, 210), and "StartColor" and "EndColor" designate the fact that the color values of RGB at the respective points are (1.0, 9, 0) and (0, 1.0, 0). Incidentally, while "GStep" designates the unit width, the unit width is not designated in particular, and may be given by the calculation of the system. A description 43 is a portion which instructs a shape of a drawing graphic form, and supplies a drawn graphic form shape of a square in which the coordinates (200, 200) represent the upper left vertex, a width is 100 and a height is 100. Subsequently, there is supplied a drawing command description 144 which instructs the filling.

Figure 24:
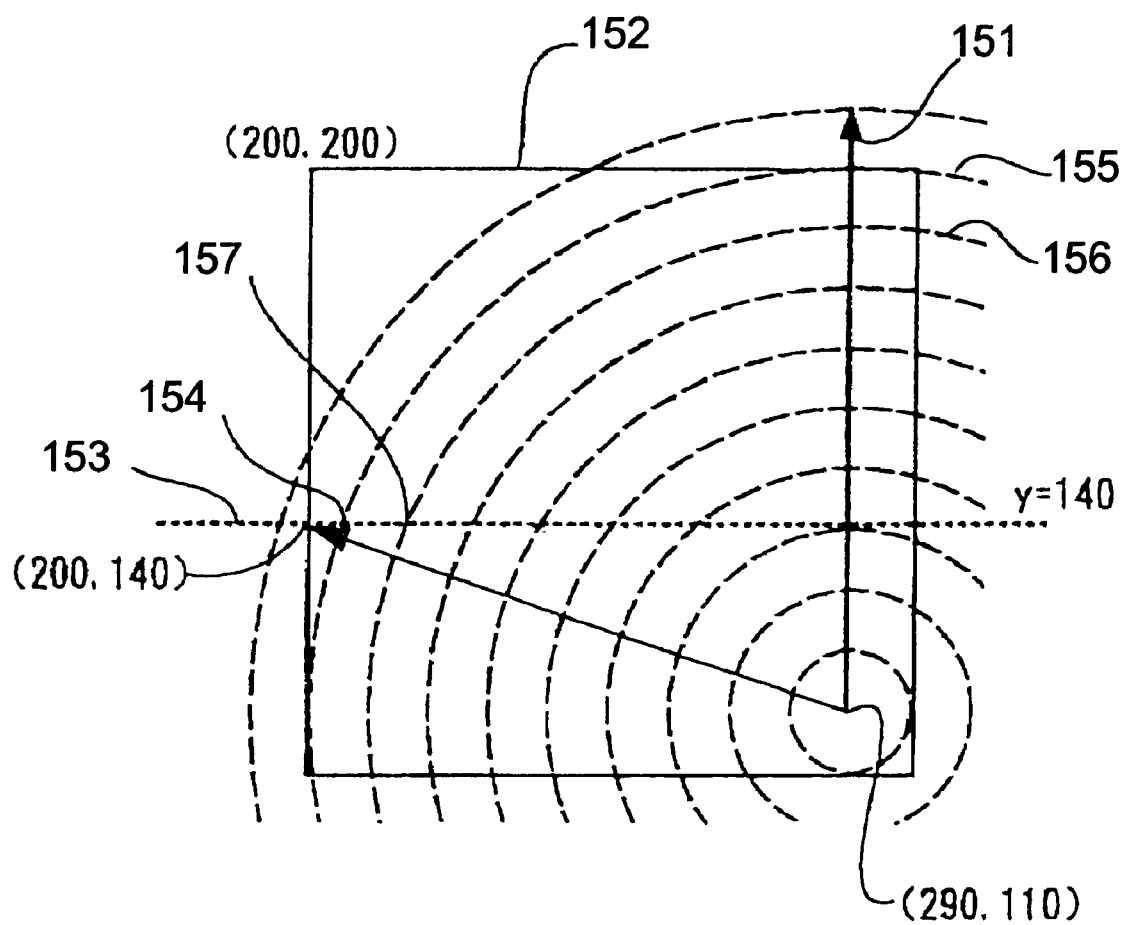
FIG. 24 is a diagram used to explain the manner in which a graphics image is drawn when the gradation designation page description language is entered into the image forming apparatus.

The inputted descriptions 141 to 143 are analyzed by the command analysis unit 113*a*, and transferred to and stored in the drawing data storage unit 113*b*. Subsequently, when the filling drawing command description 144 is detected, this detected description 144 is supplied to the drawing unit 113*c*. The drawing unit 113*c* executes the drawing processing with reference to the drawing graphic form shape data and drawing attribute data stored in the drawing data storage unit 113b. Since the filling using the band-like gradation is instructed, the gradation generation unit 113d is activated and the filling using the gradation is executed. The gradation generation unit 113d receives the above-mentioned drawing graphic form shape data and the above-mentioned drawing attribute data, and generates the gradation pattern for each scanning line in accordance with the algorithm shown in FIG. 22. FIG. 24 shows the manner in which the drawing processing is executed in accordance with the above-mentioned descriptions.

FIG. 24 is a diagram used to explain the manner in which the drawing processing is executed when the gradation designating descriptions are inputted. In FIG. 24, coordinates (290, 110) of a start point of a gradation vector 151 designated by the description 141 are the center of the concentric circle, and the color is changed about this center of the concentric circle in the radius direction. The drawing graphic form 152 is a square in which one side is 100 and coordinates (200, 200) designated by the description 143 represent the upper left vertex. Here, with respect to a scanning line 153 at the position in which y=140, for example, is satisfied, the drawing start point is designated by (200, 140). A vector formed by the above-mentioned drawing start point and a start point (290, 110) of the gradation vector 51 is represented as (−90, 30). Assuming that the number of the divided gradation vectors is 10 and that the unit width is 10, then it is to be understood that this drawing start point belongs to the tenth band-like region. The color value at this drawing start point becomes (0, 1.0, 0).

A changing point 154 of the next color on the scanning line 153 is an intersection point between the scanning line 153 and the concentric circle 155 whose radius is 90. Considering a right triangle in which a line connecting this changing point 154 and the center of the concentric circle is an oblique side and the scanning line 153 and the gradation vector 151 are two sides of the right angle, a distance between the changing point 154 and the gradation vector 151 becomes $(90^2-30^2)^{1/2}=60(2)^{1/2}$. Accordingly, the x coordinate of this changing point 154 becomes $290-60(2)^{1/2}$. Also, a distance ranging from the drawing start point to the changing point 154 becomes $90-60(2)^{1/2}$. Similarly, coordinates of the changing point 157 which is the intersection point between a concentric circle 156 having a radius 80 and the scanning line 153 become $290-10(55)^{1/2}$, and a distance from the previously-calculated changing point 154 becomes $60(2)^{1/2}-10(55)^{1/2}$. The succeeding color changing points may be successively obtained by repeating the above-mentioned operation. By effecting this processing on each of the scanning lines, gradation patterns within the drawing graphic form are generated and accumulated in the page buffer 113e. When the print instruction is issued, the content of the page buffer 113e is supplied to and printed by the print engine 114.

According to the above-mentioned method, the same graphic form need not be repeated in order to express the gradation. Moreover, since the expansion of the gradation pattern can be limited to the inside of the drawing target region, the gradation can be drawn at high speed.

Then, as a further embodiment of the present invention, the case in which the present invention is applied to the same network print system will be described in detail.

Figure 25:
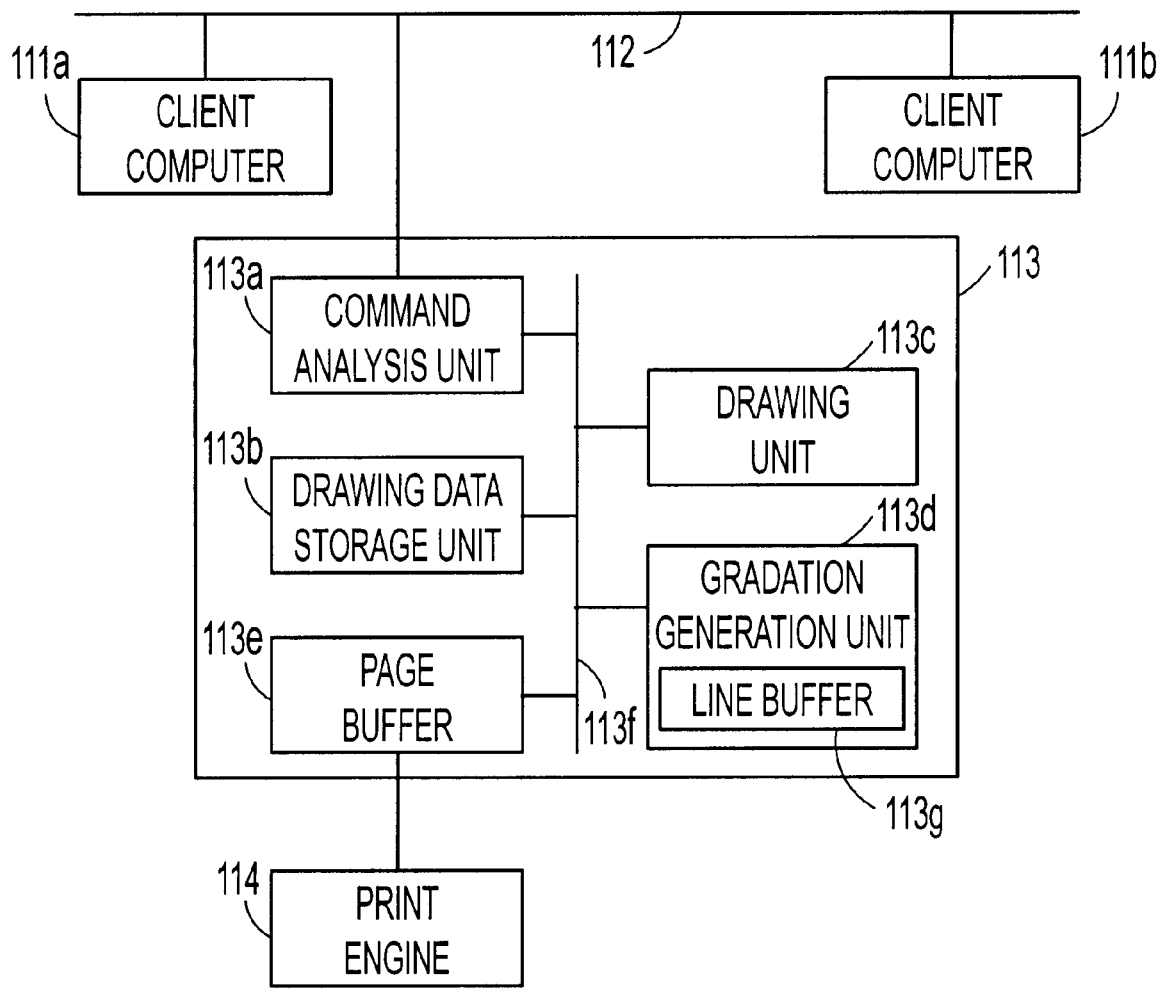
FIG. 25 is a block diagram showing a structural example of a network print system.

FIG. 25 is a block diagram showing an example of the network print system. According to the network print system shown in FIG. 25, the gradation generation unit 113d in the image forming apparatus 113 of the network print system shown in FIG. 16 incorporates therein a line buffer 113g of one line amount.

As shown in FIG. 25, the image forming apparatus 113 is connected through the network 112 to the client computers 111a, 111b. The print job created by the client computers 111a, 111b is sent through the network 112 to the command analysis unit 113a. The command analysis unit 113a interprets the content of the received print job and classifies the content of the print job into drawing data and a drawing command. The drawing data comprises shape data of drawing graphic form and attribute data such as color and stroke, both of which are accumulated in the drawing data storage unit 113b. If the gradation is designated, its information is also accumulated in the drawing data storage unit 113b. When the drawing command is detected by the command analysis unit 113a, the drawing unit 113c executes the drawing. At that time, the drawing unit 113c consumes the drawing data accumulated in the drawing data storage unit 113b.

Also, if the gradation is designated as the parameter of the drawing command, then the gradation generation unit 113d provided as a part of the function of the drawing unit 113c generates the gradation by using the information in the drawing data storage unit 113b. At that time, the gradation generation unit 113d includes therein the line buffer 113g of one line amount, and a portion of the gradation pattern in which x coordinates become the same as the center of the concentric circle is stored in the line buffer 113g. If the gradation is not designated, the drawing unit 113c executes the drawing similar to that of the ordinary page description language processing system. The drawn result of the drawing unit 113c is transferred to the page buffer 113e. When the processing of one page amount is finished, the drawn result of the drawing unit 113c is supplied to and printed by the print engine 114.

Operations of other portions that the gradation generation unit 113d and the processing algorithm are similar to those of the first embodiment and therefore need not be described.

When the gradation generation is instructed to the gradation generation unit 113d and the processing with respect to a certain scanning line is started, gradation patterns are generated successively. Of the gradation patterns thus generated, up to the portion in which x coordinates become the same as the center of the concentric circle is stored in the line buffer 113g disposed in the inside of the gradation generation unit 113d. This is equivalent to the operation in which the left half portion of the gradation pattern of the concentric circle is saved in the line buffer 113g. Thereafter, when a distance up to the next color changing point is further calculated, the contents of the line buffer 113g are checked in the reverse order and used, thereby resulting in gradation pattern being generated.

An operation of the image forming apparatus used when the above-mentioned processing is applied to inputted data shown in FIG. 26 will be described next.

Figure 26:
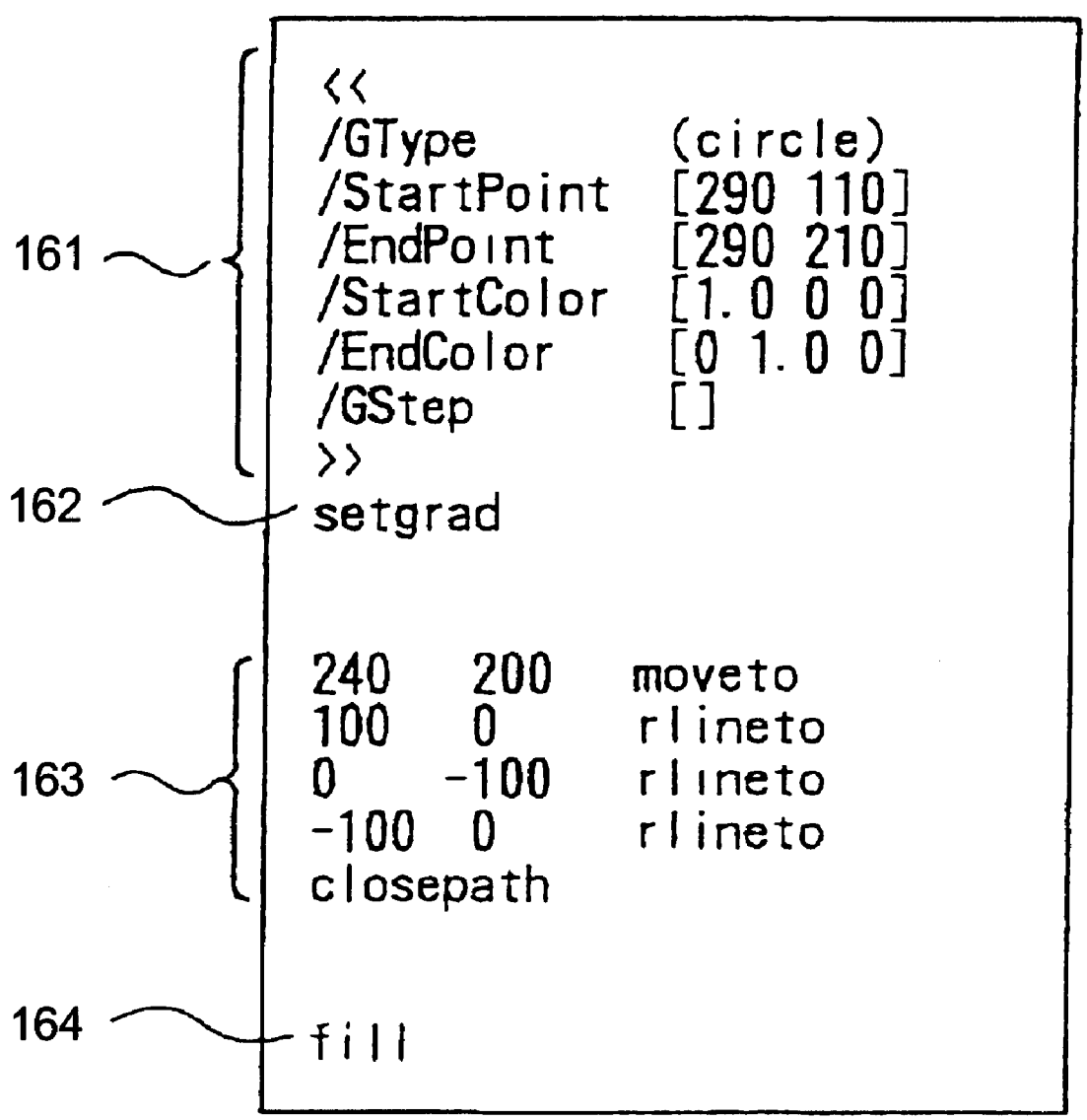
FIG. 26 is a diagram showing a gradation designation page description language entered into the image forming apparatus.

FIG. 26 is a diagram showing an example of a gradation designating page description language inputted to the image forming apparatus. In FIG. 26, a description 161 is a portion which supplies parameters necessary for describing the gradation, and supplies the gradation of the concentric circle configuration in which coordinates of the gradation vector start point become (290, 110), coordinates of the end point become (290, 210), and the colors at the respective points become (1.0, 0, 0), (0, 1.0, 0). A description 162 designates the gradation. Also, a description 163 supplies a drawing graphic form shape which becomes a square in which coordinates (240, 200) represent the upper left vertex and the width is 100 and the height is 100. These descriptions 161 to 163 are analyzed by the command analysis unit 113a, supplied to and stored in the drawing data storage unit 113b.

Figure 27:
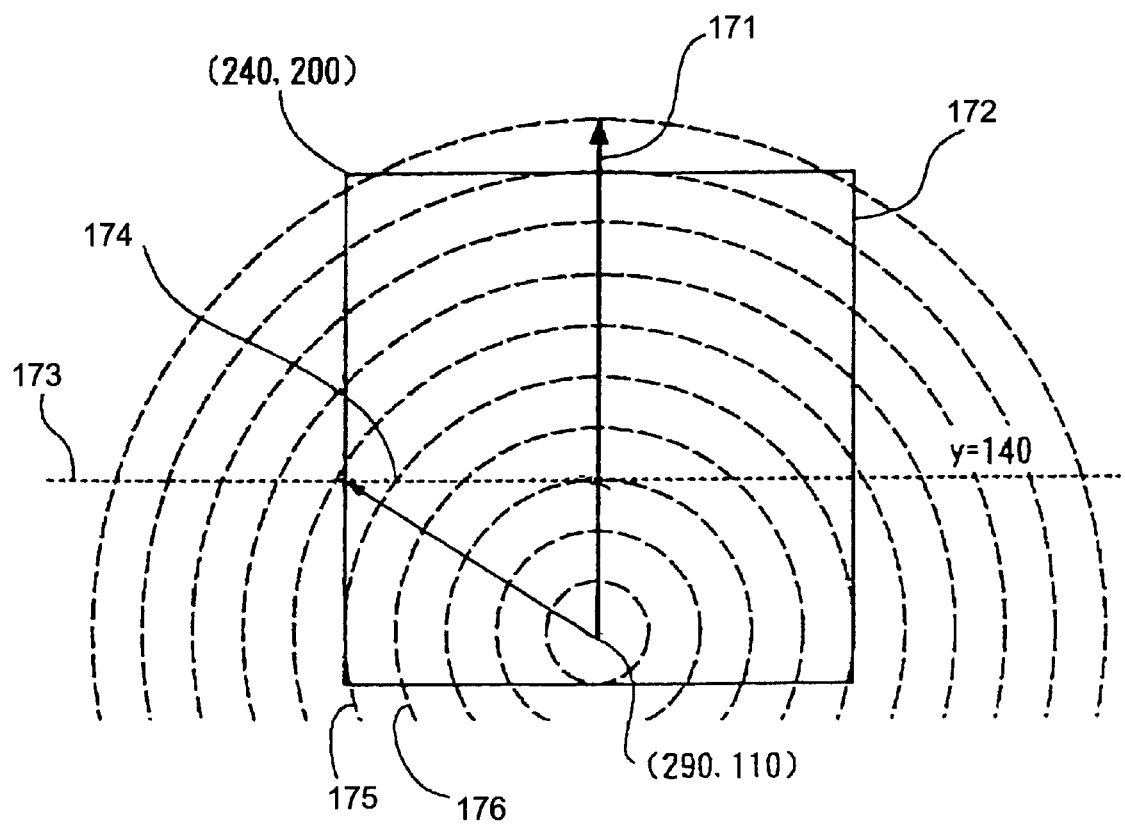
FIG. 27 is a diagram used to explain the manner in which a graphics image is drawn when the gradation designation page description language is entered into the image forming apparatus.

Subsequently, when the description 164 of the drawing command for instructing the filling is detected, such detected description 164 is supplied to the drawing unit 113c. The drawing unit 113c executes the drawing processing with reference to the drawing graphic form shape data and the drawing attribute data stored in the drawing data storage unit 113b. Here, since the filling using the gradation of the concentric circle configuration is instructed, the gradation generation unit 113d is activated, and the drawing range specifying processing, i.e. the filling processing using the gradation, is executed. The gradation generation unit 113d receives the above-mentioned drawing graphic form shape data and the above-mentioned drawing attribute data, and generates the gradation pattern for each scanning line in accordance with the previously-described algorithm. FIG. 27 shows the manner in which graphic form is drawn in accordance with the above-mentioned descriptions.

FIG. 27 is a diagram used to explain the drawing processing executed when the gradation designating description is inputted. In FIG. 27, coordinates (290, 110) of a start point of a gradation vector designated by the description 161 represent a center of a concentric circle. A color is progressively changed about this center in the radius direction. A drawing graphic form 172 is a square in which coordinates (240, 200) designated by the description 163 represent the upper left vertex and one side is 100. Here, with respect to a scanning line 173 of the position at which y=140, for example, is satisfied, a drawing start point becomes (240, 140), and a vector formed by the above drawing start point and a start point (290, 110) of the gradation vector 171 becomes (−50, 30). Assuming that the number of the divided gradation vectors is 10 and that the unit width is 10, then it is to be understood that this drawing start point belongs to the sixth band-like region. The color values at this drawing start point are represented as (0.4, 0.6, 0).

A changing point 174 of the next color on the scanning line 173 is an intersection point between the scanning line 173 and a concentric circle 175 having a radius of 50. Considering a right triangle in which a line connecting this changing point 174 and the center of the concentric circle is an oblique side and the scanning line 173 and the gradation vector 171 are two sides of the right angle, a distance between the changing point 174 and he gradation vector 171 becomes $(50^2-30^2)^{1/2}=40$, and an x coordinate of this changing point 174 becomes 250. Also, a distance from the drawing start point to the changing point 174 becomes 10. At that time, 40, which is the distance between the changing point and the gradation vector 171, is stored in the line buffer 113g. When a similar processing is effected on the next concentric circle, coordinates of an intersection point between a concentric circle 176 having a radius of 40 and the scanning line 173 become $290-10(7)^{1/2}$, and a distance from the previously-calculated changing point 174 becomes $50-10(7)^{1/2}$. Here, similarly, $10(7)^{1/2}$ which is the distance between the intersection point and the gradation vector 171 is stored in the line buffer 113g. Of the changing points of the succeeding colors, the changing points up to a position x=290 of the gradation vector 171 are successively calculated by repeating the above-mentioned operation, and stored in the line buffer 113g.

Figure 28:
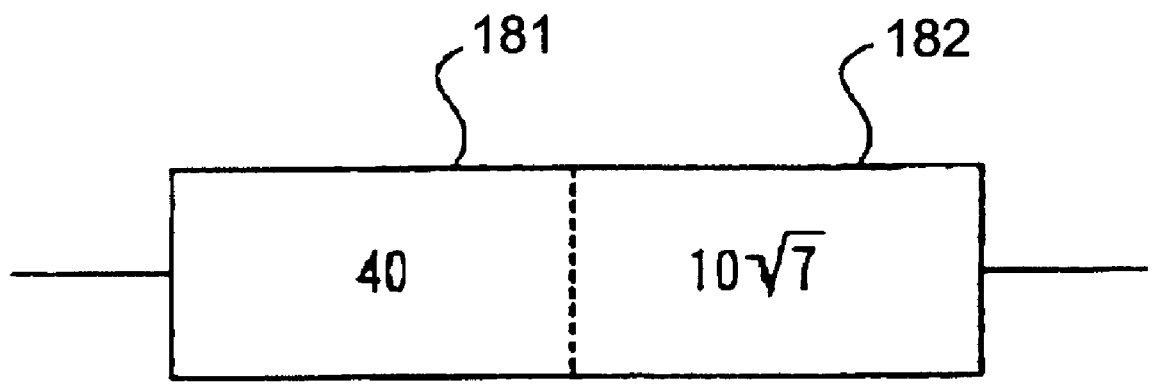
FIG. 28 is a diagram showing the manner in which distance data is stored in the line buffer.

FIG. 28 is a diagram showing an example of the manner in which distance data are stored in the line buffer 113g. In the line buffer 113g, there are successively stored a distance between the intersection point on the scanning line 173 and the gradation vector 171 each time the distance is calculated. In the example of FIG. 27, when then color changing point at the scanning line 173 in which the y coordinate position is 140 is calculated, two data 181, 182 of "40", "$10(7)^{1/2}$" are successively calculated as a distance between the intersection point on the scanning line 173 and the gradation vector 171 and stored in the line buffer 113g, in that order. In the example of FIG. 27, since the changing point of the next color at the intersection point between the scanning line 173 and the concentric circle 176 is located at the position of the gradation vector 171, at the time point the two data 181, 182 are stored as the distance data, the calculation of the distance is ended. Coordinates at the intersection point in the portion which exceeds the gradation vector position x=290 are successively obtained by checking the contents of the line buffer 113g in the opposite direction and by adding the resultant values in the sequential order.

By executing this processing on each of the scanning lines, the gradation pattern in the inside of the drawing graphic form is generated and accumulated in the page buffer 113e. When the print instruction is issued, the content of the page buffer 113e is supplied to and printed by the print engine 114.

According to the above-mentioned method, since the calculation concerning the repetition of the same pattern can be avoided, it is possible to generate gradation patterns at high speed.

As is clear from the above description, according to the present invention, since the filling processing of the very small regions of the same color need not be repeated, and the gradation pattern need not be expanded in the large region and the color changing position on the scanning line may be obtained by a simple calculation thereby generating the gradation pattern unlike the prior art, the load of the gradation drawing may be alleviated, and a high-speed drawing can be realized. Also, since the gradation pattern is generated in the scanning line direction similarly to the ordinary filling processing, such processing can be realized as a special case of the ordinary filling processing. There is then the effect that the such property can be matched with other drawing processing than the gradation in which the processing is executed at the unit of the scanning line.

As described above, according to the present invention, as the drawing data, the two points on the drawing plane and the color values at the respective points become parameters for drawing the concentric circle gradation. Thus, it becomes possible to easily calculate the color changing position on the scanning line by comparing the concentric circle-shaped region calculated from these parameters with the scanning line. Thus, the filling of the very small interval need not be repeated, and hence the load of the gradation drawing may be alleviated considerably. Further, since the processing is advanced in the scanning direction, the processing can be realized as a special case of the ordinary filling processing.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

DESCRIPTION OF THE REFERENCE NUMERALS 1a, 1b . . . client computers
2 . . . network
3 . . . image forming apparatus
4 . . . print engine
11 . . . command analysis unit
12 . . . drawing data storage unit
13 . . . drawing unit
14 . . . gradation generation unit
15 . . . page buffer
101 . . . the command analysis means
102 . . . the drawing means
103 . . . the drawing data storage means
104 . . . the gradation pattern expansion means
111a, 111b . . . the client computer
112 . . . the network
113 . . . the image forming apparatus
113a . . . the command analysis unit
113b . . . the drawing data storage unit
113c . . . the drawing unit
113d . . . the gradation generation unit
113e . . . the page buffer
113f . . . the bus
113g . . . the line buffer
114 . . . the print engine

What is claimed is:

1. An image forming apparatus that obtains an output image by executing image drawing commands, comprising:
  a drawing unit that draws a gradation pattern based on image drawing commands and gradation information; and
  a gradation generation unit that generates gradation information, wherein:
    said drawing unit accesses said gradation information when inputted data is image drawing commands that define a gradation pattern on a drawing plane and said gradation information includes a vector defined by coordinate values of a vector start point and a vector end point and color values of said vector start point and said vector end point,
    said gradation generation unit generates a gradation pattern whose color value changes along said vector in a plurality of adjacent bands that are of uniform color and that are perpendicular to said vector, and further generates gradation information for successive scan lines by successively identifying portions of the successive scan lines included in each band in a scan line direction in a drawing region for those successive scan lines showing said gradation pattern, and
    said gradation generation unit determines a distance on a scan line by multiplying a length between two arbitrary points on said vector by a reciprocal number of a cosine of an angle formed by said vector and said scan line.

2. An image forming apparatus that obtains an output image by executing image drawing commands, comprising:
  a drawing unit that draws a gradation pattern based on image drawing commands and gradation information; and
  a gradation generation unit that generates gradation information, wherein:
    said drawing unit accesses said gradation information when inputted data is image drawing commands that define a gradation pattern on a drawing plane and said gradation information includes a vector defined by coordinate values of a vector start point and a vector end point and color values of said vector start point and said vector end point,
    said gradation generation unit generates a gradation pattern whose color value changes along said vector in a plurality of adjacent bands that are of uniform color and that are perpendicular to said vector, and further generates gradation information for successive scan lines by successively identifying portions of the successive scan lines included in each band in a scan line direction in a drawing region for those successive scan lines showing said gradation pattern, and
    said gradation generating unit determines a length of a projection of a line connecting an arbitrary point P on a scan line with said vector start point onto said vector, and determines a color value at said point P by comparing said length with a position of a boundary of said band on said vector.

3. An image forming apparatus that obtains an output image by executing image drawing commands, comprising:
  a drawing unit that draws a gradation pattern based on image drawing commands and gradation information; and
  a gradation generation unit that generates gradation information, wherein:
    said drawing unit accesses said gradation information when inputted data is image drawing commands that define a gradation pattern on a drawing plane and said gradation information includes a vector defined by coordinate values of a vector start point and a vector end point and color values of said vector start point and said vector end point,
    said gradation generation unit generates a gradation pattern whose color value changes along said vector in a plurality of adjacent bands that are of uniform color and that are perpendicular to said vector, and further generates gradation information for successive scan lines by successively identifying portions of the successive scan lines included in each band in a scan line direction in a drawing region for those successive scan lines showing said gradation pattern, and
    said gradation generation unit converts a distance BC on said vector between a point B at which a straight line passing through an arbitrary point A on a scan line and perpendicular to said vector crosses said vector and a point C at which a boundary of said band crosses said vector into a distance on a scan line and determines coordinates of said point C by adding the converted distance to coordinates of said point A.

4. An image forming apparatus that obtains an output image by executing image drawing commands, comprising:
  a drawing unit that draws a gradation pattern based on image drawing commands and gradation information; and
  a gradation generation unit that generates gradation information, wherein:
    said drawing unit accesses said gradation information when inputted data is image drawing commands that define a gradation pattern on a drawing plane and said gradation information includes a vector defined by coordinate values of a vector start point and a vector end point and color values of said vector start point and said vector end point,
    said gradation generation unit generates a gradation pattern whose color value changes along said vector in a plurality of adjacent bands that are of uniform color and that are perpendicular to said vector, and further generates gradation information for successive scan lines by successively identifying portions of successive can lines included in each band in a scan line direction in a drawing region for successive scan lines showing said gradation pattern, and said gradation generation unit determines coordinate values of a point D at which a straight line passing through said vector start point and perpendicular to said vector crosses a scan line, and determines coordinate values of an intersection point between a scan line and a boundary of said band by adding to the coordinate values of said point D a value in which a width of said band on said vector is converted into a distance on a scan line.

5. The image forming apparatus as claimed in claim 4, wherein said gradation generation unit determines a color value at a point P by comparing coordinate values of an intersection point between said scan line and said boundary of said band with coordinate values of one arbitrary point P on said scan line.

6. The image forming apparatus as claimed in claim 4, wherein said gradation generation unit includes a line buffer having a capacity of scanning one line amount and said line buffer holds gradation information of one scan line and generates gradation information in other scan lines with reference to contents of said line buffer.

7. A gradation pattern generating method in which a vector defined by coordinate values of a vector start point and a vector end point on a drawing plane and color values of said vector start point and said color end point are inputted as gradation information for gradation patterns, comprising:

determining a color value on a scan line at a boundary in a drawing region;

identifying in a scan line direction at least one position on a scan line where color values change in said drawing region; and successively identifying in the scan line direction at least one position on each successive scan line where color values change in said drawing region, wherein;

said gradation pattern whose color value changes along said vector comprises a plurality of bands perpendicular to said vector, each band having a uniform color value, said boundary in said drawing region has a color value determined by a length of a projection onto said vector of a line connecting an intersection point of said boundary position with said vector start point, said at least one position on a scan line where color values change is converted into a distance on a scan line, and successive color changing points on said scan line are successively obtained by adding said converted distances to said length obtained for said boundary position.

8. A gradation pattern generating method in which a vector defined by coordinate values of a vector start point and a vector end point on a drawing plane and color values of said vector start point and said color end point are inputted as gradation information for gradation patterns, comprising:

determining a color value on a scan line at a boundary in a drawing region;

identifying in a scan line direction at least one position on a scan line where color values change in said drawing region; and successively identifying in the scan line direction at least one position on each successive scan line where color values change in said drawing region, wherein;

said gradation pattern whose color value changes along said vector comprises a plurality of bands perpendicular to said vector, each band having a uniform color value and having at least one intersection point between a boundary line of that band and a scan line, where said intersection point is set to a color changing point by comparing coordinates of said intersection point and a boundary line of that band.

9. The gradation pattern generating method as claimed in claim 7, wherein said converted distances on a scan line are stored and said converted distances on successive scan lines are generated by using said gradation pattern information and said vector.

10. A gradation pattern drawing method for obtaining a gradation output image of a concentric circle shape by executing image drawing commands, comprising:

obtaining a color start point, a color value of said color start point, a color change range and a color end point, the color start point and color end point defining a radial gradation vector on a drawing plane;

determining a unit width of an annular band of the same color value on the basis of said color start point, said color change range, and said color end point;

identifying which annular band and color value a drawing start point within a graphic form on a scan line belongs to, based on a distance from said drawing start point to said color start point;

determining a first distance from a drawing start point on a scan line to an intersection point on a radial line from said color start point to said scan line that is perpendicular to said scanning line;

determining a second distance from said drawing start point to a next color change point on a scan line based on a difference between said first distance and a third distance from said next color change point to said intersection point of said radial line;

storing said second distance and said color value of said next color change point as gradation information;

determining successive distances between successive next color change points on a scan line until a total of such successive distances lies beyond said graphic form; and storing said successive distances and said color values of said next color change points as gradation information.

11. An image forming apparatus for obtaining a gradation output image of a circular shape by executing image drawing commands, comprising:

a drawing unit that draws a gradation pattern based on image drawing commands and gradation information; and a gradation generation unit that generates gradation information of a circular shape comprised of concentric annular bands that are of uniform color value, wherein;

said drawing unit accesses said gradation generation unit when inputted data is image drawing commands for drawing gradation, and transfers coordinates of a color start point, a color value of said start point, a color change range and a color end point that define a radial gradation vector on a drawing plane as gradation information for a gradation pattern and a gradation drawing instruction for drawing an output image of circular shape having said gradation pattern, said gradation generation unit expresses a gradation pattern whose color value changes along said radial vector in a plurality of adjacent annular bands by using said gradation information and further generates gradation information for respective scan lines by successively specifying portions included in each said annular band in the scan line direction in a drawing region for drawing successive scan lines showing said gradation pattern, said gradation generation unit determines a first distance from a drawing start point on a scan line to an intersection point on said scan line with a radial line from said color start point that is perpendicular to said scan line, said gradation generation unit determines a second distance from said drawing start point to a next color change point on a scan line based on a difference between said first distance and a third distance from said next color change point to said intersection point of said radial line, and stores said second distance and said color value of said next color change point as gradation information, said gradation generation unit determines successive distances between successive next color change points on a scan line until a total of said successive distances lies beyond said graphic form, and said gradation generation unit stores said successive distances and said color values of said next color change points as gradation information.

* * * * *